(12) United States Patent
Yoshikawa et al.

(10) Patent No.: US 7,149,018 B2
(45) Date of Patent: Dec. 12, 2006

(54) OPTICAL SCANNING DEVICE AND IMAGE FORMING APPARATUS PROVIDED WITH THE SAME

(75) Inventors: Masanori Yoshikawa, Neyagawa (JP); Hideo Hirose, Hirakata (JP); Keisuke Fujimoto, Hirakata (JP); Masaaki Nakano, Shijounawate (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 11/251,897

(22) Filed: Oct. 18, 2005

(65) Prior Publication Data

US 2006/0092493 A1    May 4, 2006

(30) Foreign Application Priority Data

Oct. 19, 2004    (JP)    ............................. 2004-304084

(51) Int. Cl.
*G02B 26/08*    (2006.01)

(52) U.S. Cl. .................................... 359/204; 347/257

(58) Field of Classification Search ................ 359/204, 359/196–202; 347/233, 234, 235, 248, 250, 347/256–261
See application file for complete search history.

(56) References Cited

U.S. PATENT DOCUMENTS

| | | | |
|---|---|---|---|
| 4,591,903 A | 5/1986 | Kawamura et al. | |
| 5,877,885 A | 3/1999 | Suda et al. | |
| 5,903,377 A * | 5/1999 | Takano et al. | ............... 359/201 |
| 2003/0001944 A1* | 1/2003 | Yoshida et al. | ............. 347/241 |
| 2003/0112486 A1* | 6/2003 | Kudo | .......................... 359/216 |

FOREIGN PATENT DOCUMENTS

| | | |
|---|---|---|
| JP | 5895361 | 6/1983 |
| JP | 2003200609 | 7/2003 |
| JP | 2004219817 | 8/2004 |

* cited by examiner

*Primary Examiner*—Euncha P. Cherry
(74) *Attorney, Agent, or Firm*—Stevens, Davis, Miller & Mosher, LLP

(57) ABSTRACT

In an optical scanning device using two polygon mirrors, the present invention achieves both a simplification of the device and a reduction of vibrations. An optical scanning device is provided with a first optical system including a polygon mirror and a second optical system including a polygon mirror. The polygon mirror provided in the first optical system and the polygon mirror provided in the second optical system are configured such that they rotate in mutually opposite directions. Further, the optical scanning device is provided with one BD sensor for detecting laser beams that are scanned with the polygon mirrors. Slits with mutually different widths are arranged between the BD sensor and the respective polygon mirrors of the first and second optical systems.

8 Claims, 18 Drawing Sheets

OPTICAL SCANNING DEVICE AND IMAGE FORMING APPARATUS PROVIDED WITH THE SAME

This application claims the benefit of Japanese Patent Application JP 2004-304084 filed on Oct. 19, 2004, the entire disclosure of which is hereby incorporated by reference as if fully set forth herein.

BACKGROUND OF THE INVENTION

1. Field of the Invention

The present invention relates to an optical scanning device that can be used for laser beam printers, laser facsimiles, and digital copiers, for example. Further, the present invention relates to an image forming apparatus provided with such an optical scanning device.

2. Description of Related Art

Conventionally, as an optical scanning device of this type, a device is known which simultaneously scans four different photosensitive drums by combining two optical systems in each of which one polygon mirror (rotary polygon mirror) deflects laser beams from two semiconductor lasers serving as light sources such that two different photosensitive drums are scanned (see JP S58-95361A, for example).

Furthermore, in thus configured optical scanning devices, four optical detectors for determining a timing to start exposure are necessary for the laser beams, but a configuration has been proposed in which the number of components is reduced by providing only one optical detector for each polygon mirror in order to reduce the cost (see JP 2003-200609A, for example).

The optical scanning device disclosed in JP 2003-200609A is provided with a laser beam detector that is disposed on a scanning path of the first laser beam, and that outputs a signal indicating the detection of a beam when the laser beam is input, a horizontal synchronization signal generator for generating a horizontal synchronization signal serving as a reference when determining a timing to output an image of the first laser beam, by inputting the signal from the laser beam detector, and a second laser beam timing signal generator for generating a signal determining a timing to output an image of the second laser beam, by inputting and delaying, for a predetermined time, the horizontal synchronization signal of the first laser beam.

Thus configured optical scanning devices have an advantage, for example, that components such as reflecting mirrors can be reduced and that the degree of freedom in arrangement (i.e. in design) is relatively high.

However, two polygon mirrors as optical deflectors are used in thus configured optical scanning devices, so that it is necessary to use two polygon motors as rotatively driving devices, resulting in the problem that vibrations are more severer than those in optical scanning devices with one polygon motor.

Therefore, a new technique has been required that reduces vibrations in an optical scanning device using two polygon mirrors.

SUMMARY OF THE INVENTION

The present invention was made to solve the above-described problem in conventional techniques, and it is an object thereof to provide an optical scanning device that uses two polygon mirrors (optical deflectors), and that can achieve both a simplification of the device and a reduction of vibrations. Furthermore, it is another object of the present invention to provide an image forming apparatus that is provided with the optical scanning device using two polygon mirrors (optical deflectors), and that can achieve a suppression of vibrations while reducing the cost.

In order to achieve the above-described objects, an optical scanning device according to the present invention is provided with a first and a second optical system each including two light sources and one optical deflector for scanning light beams from the two light sources with mutually different deflection faces of the optical deflector. Two first imaging optical systems are arranged between the optical deflector and the two respective light sources, that guide the light beams from the two light sources to the deflection faces of the optical deflector, and that form linear images on the deflection faces. Two second imaging optical systems are arranged between the optical deflector and two respective surfaces to be scanned, that guide the light beams from the optical deflector to the two surfaces to be scanned, and that form images on the two surfaces to be scanned. The optical scanning device simultaneously exposes, by scanning, the four surfaces to be scanned. The optical deflector provided in the first optical system and the optical deflector provided in the second optical system rotate in mutually opposite directions.

According to the configuration of the optical scanning device, the two optical deflectors (polygon mirrors) rotate in mutually opposite directions, and thus the rotation torques during the starting-up and the operation of the two motors for rotatively driving the two polygon mirrors cancel each other, resulting in reduced vibrations compared with those in conventional cases in which two polygon mirrors rotate in the same direction. Thus, according to the configuration of the optical scanning device, it is possible to achieve both a simplification of the device and a reduction of vibrations.

Furthermore, in a preferred configuration of the optical scanning device of the present invention, one optical detector for detecting light beams that are scanned with the optical deflectors is provided, and the optical detector detects both light beams that are scanned by the first optical system and light beams that are scanned by the second optical system. According to this preferred example, the number of components is reduced, so that both a simplification of the device and a reduction of vibrations can further be achieved.

In this case, it is preferable that a first and a second slit arranged between the optical detector and the respective optical deflectors in the first and the second optical systems are provided, and a width of the first slit is different from that of the second slit. It is also preferable that a first and a second set of slits arranged between the optical detector and the respective optical deflectors in the first and the second optical systems are provided, and a number of openings of the first set of slits is different from a number of openings of the second set of slits. According to these preferred examples, light beams from the first optical system and light beams from the second optical system can be reliably recognized even with one optical detector.

Furthermore, in this case, it is preferable that the first and the second optical systems are arranged so as to be mirror symmetrical with respect to a plane extending through the optical detector. According to this preferred example, it is possible to further reduce vibrations.

Furthermore, in this case, it is preferable that the optical detector receives light beams that are scanned, through a plurality of light-blocking faces having slits with mutually different combinations of width, number, and interval. According to this preferred example, even in the configuration in which a plurality of scan lights that are independent of each other and that are asynchronously scanned are incident on the same optical detector, it is possible to distinguish the scan lights from each other to precisely generate a synchronization signal for forming an image with respect to each scan light, by analyzing the timing waveforms of the output signals from the optical detector.

Furthermore, in this case, it is preferable that the light beams that are scanned are modulated with signals having mutually different frequencies at least when the optical detector detects the light beams. According to this preferred example, even in the configuration in which a plurality of scan lights that are independent of each other and that are asynchronously scanned are incident on the same optical detector, it is possible to distinguish the scan lights from each other to precisely generate a synchronization signal for forming an image with respect to each scan light.

Furthermore, an image forming apparatus according to the present invention includes the above-described optical scanning device of the present invention, a plurality of rotatable photosensitive members that correspond to a plurality of different colors, whose outer circumferential surfaces serve as the surfaces to be scanned, and that have substantially cylindrical shapes extending in the scan direction of light beams of the optical scanning device. A plurality of developing devices from which toner with different colors is supplied to the outer circumferential surfaces of the plurality of photosensitive members and is attached thereon. An intermediate transfer belt onto which color toner images formed on the outer circumferential surfaces of the plurality of photosensitive members are overlapped one on another to be transferred, and a transferring unit for retransferring the toner images that have been transferred onto the intermediate transfer belt to a recording material.

According to the configuration of the image forming apparatus, the optical scanning device of the present invention is provided, and thus it is possible to provide an image forming apparatus that can achieve a suppression of vibrations while reducing the cost.

According to the present invention, both a simplification of the device and a reduction of vibrations can be achieved in an optical scanning device using two polygon mirrors (optical deflectors).

BRIEF DESCRIPTION OF THE DRAWINGS

The present invention is further described in the detailed description which follows with reference to the below-noted plurality of drawings by way of non-limiting examples of exemplary embodiments of the present invention in which like reference numerals represent similar parts throughout the several views of the drawings and wherein.

DETAILED DESCRIPTION OF THE INVENTION

The following will explain, with reference to the above-described drawings, preferred embodiments of the present invention in which like characters represent like elements. The particulars shown therein are by way of illustrative examples of the embodiments of the present invention only and are presented in the cause of providing what is believed to be the most useful and readily understood description of the principles and conceptual versions of the present invention. In this regard, no attempt is made to show structural details of the invention in more detail then is necessary for the fundamental understanding of the present invention, the description taken with the above-described drawings making apparent to those skilled in the art how the several forms of the present invention may be embodied in practice.

Hereinafter, the present invention will be described by way of illustrative embodiments with reference to the drawings.

First Embodiment

Figure 1:
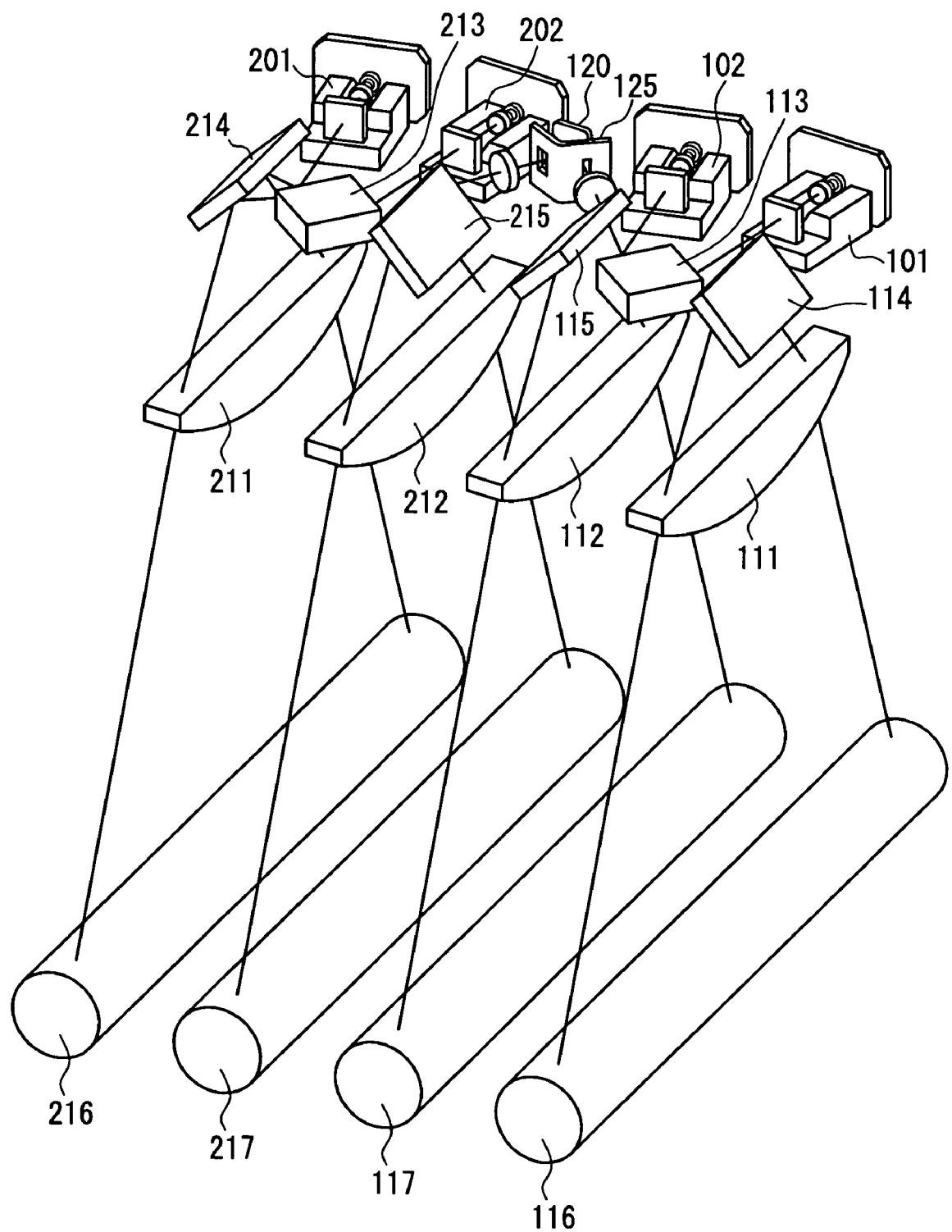
FIG. 1 is a perspective view showing a relevant part of an optical scanning device in a first embodiment of the present invention.
Figure 2:
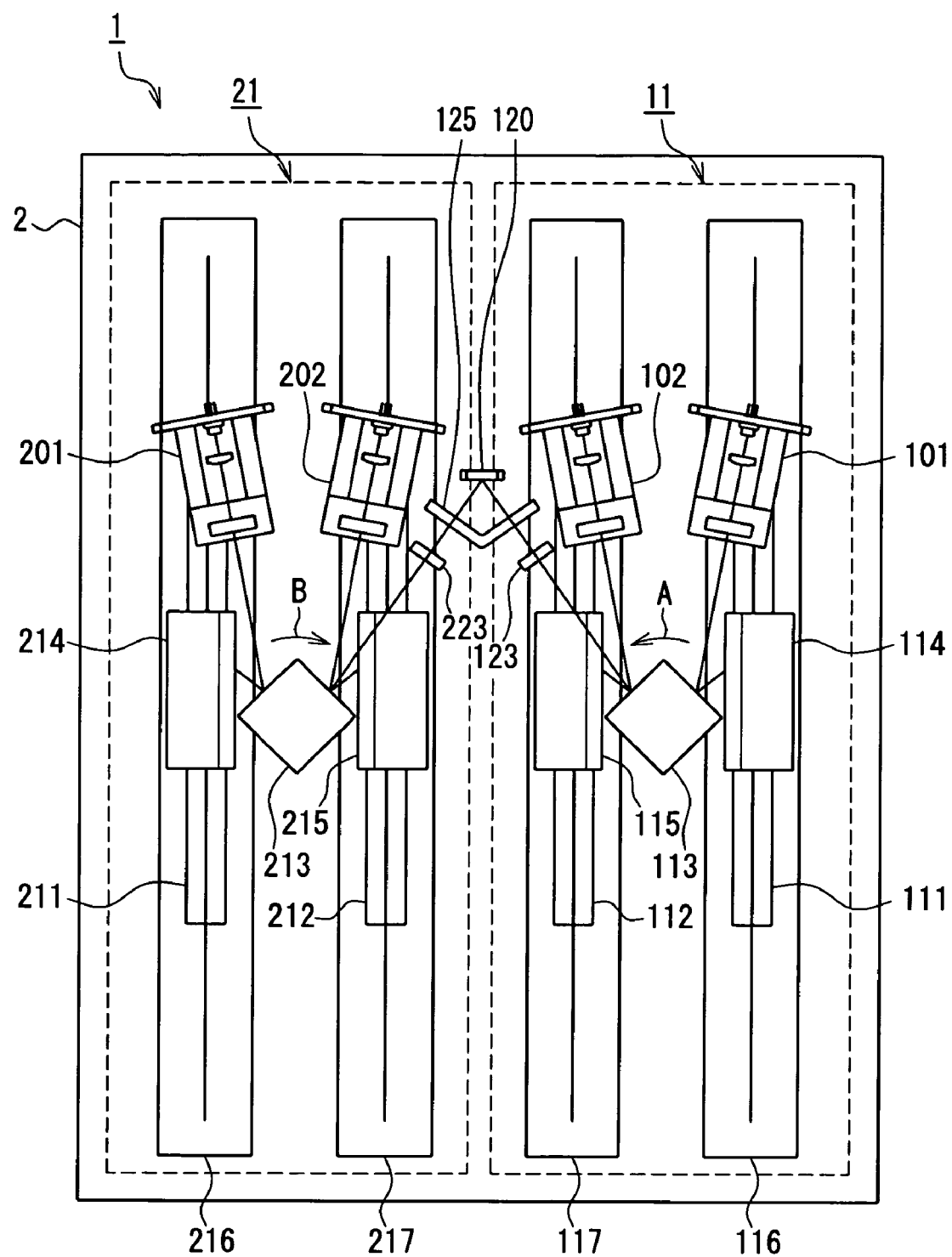
FIG. 2 is a plan view showing the optical scanning device in the first embodiment of the present invention.
Figure 3:
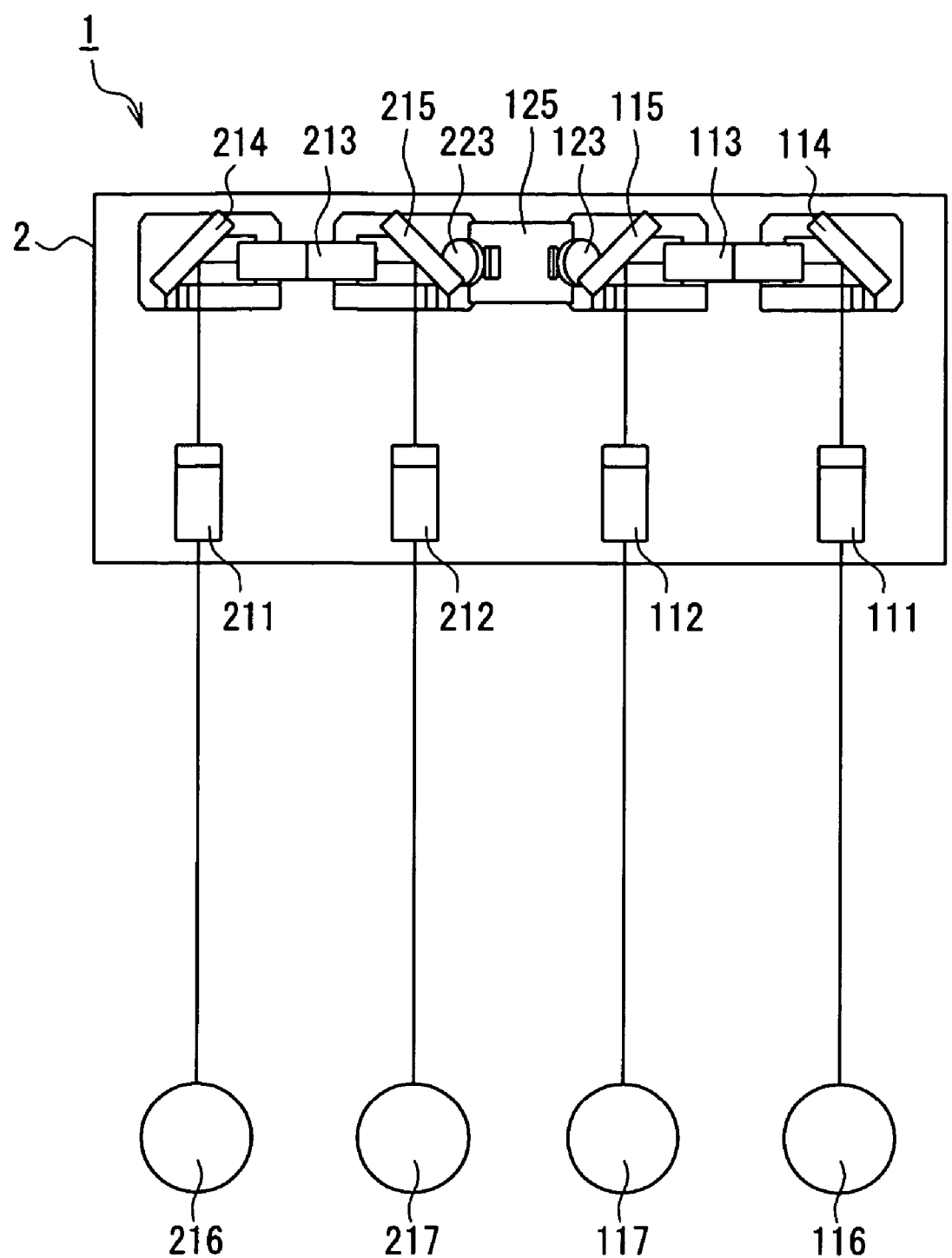
FIG. 3 is a front view showing the optical scanning device in the first embodiment of the present invention.
Figure 4:
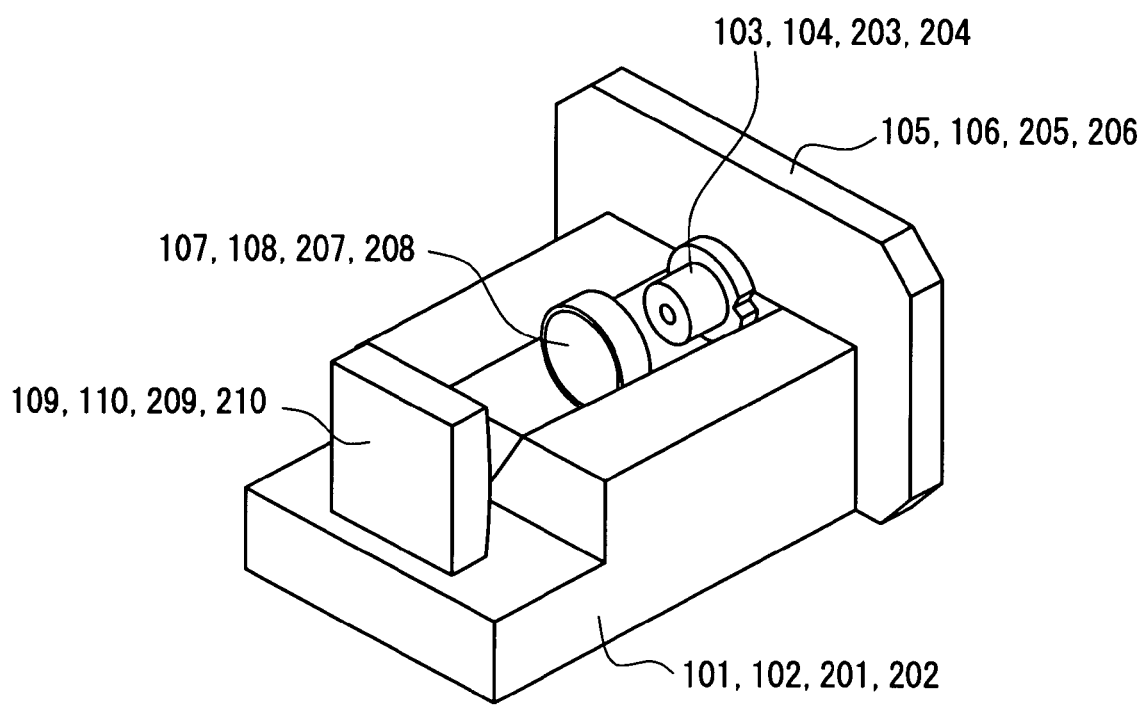
FIG. 4 is a perspective view showing a first imaging optical system of the optical scanning device in the first embodiment of the present invention.

First, an optical scanning device according to a first embodiment of the present invention is described with reference to FIGS. 1 to 5. FIG. 1 is a perspective view showing a relevant part of the optical scanning device in this embodiment. FIG. 2 is a plan view showing the optical scanning device in this embodiment. FIG. 3 is a front view showing the optical scanning device in this embodiment. FIG. 4 is a perspective view showing a first imaging optical system of the optical scanning device in this embodiment.

Figure 5:
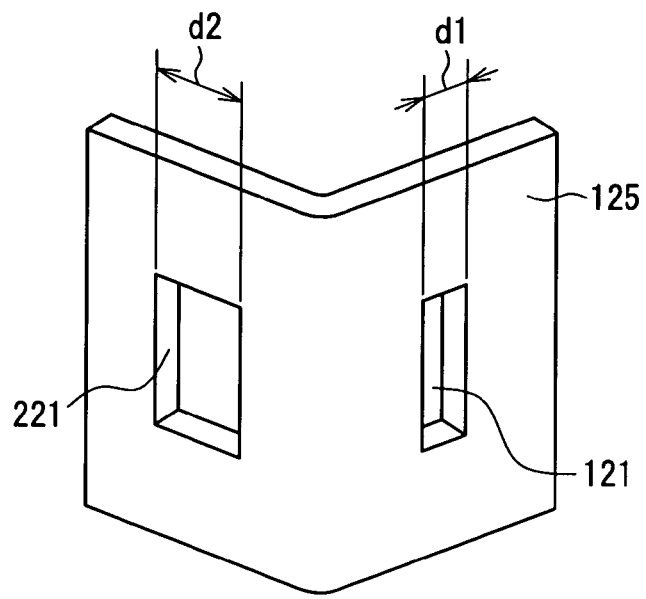
FIG. 5 is a perspective view showing a slit plate used in the optical scanning device in the first embodiment of the present invention.

FIG. 5 is a perspective view showing a slit plate used in the optical scanning device in this embodiment.

As shown in FIGS. 1 to 4, an optical scanning device 1 of this embodiment is configured such that an optical system 11 serving as a first optical system and an optical system 21 serving as a second optical system are accommodated in one housing frame 2.

The optical system 11 is provided with two light source blocks 101 and 102, a polygon mirror 113 serving as an optical deflector in which light beams from the light source blocks 101 and 102 are scanned on its mutually different deflection faces (reflection faces), and two fθ lenses 111 and 112.

The light source blocks 101 and 102 are respectively provided with semiconductor lasers 103 and 104 serving as light sources, laser driving substrates 105 and 106 provided with semiconductor laser circuits for driving the semiconductor lasers 103 and 104, collimator lenses 107 and 108, and plano-convex cylindrical lenses 109 and 110.

The collimator lenses 107 and 108 and the plano-convex cylindrical lenses 109 and 110 constitute first imaging optical systems respectively in which laser beams (light beams) from the semiconductor lasers 103 and 104 are guided to deflection faces of the polygon mirror 113 to form linear images on the deflection faces.

The polygon mirror 113 is a rotary polygon mirror having a plurality of deflection faces, and is rotationally driven by a motor (hereinafter, referred to as "polygon motor") that is not shown in the drawings. Laser beams reflected by the deflection faces of the polygon mirror 113 are scanned in accordance with the rotation of the polygon mirror 113.

The laser beams that have been scanned with the polygon mirror 113 are deflected by reflecting mirrors 114 and 115 arranged between the polygon mirror 113 and the respective fθ lenses 111 and 112, and are then guided to the fθ lenses 111 and 112.

The fθ lenses 111 and 112 constitute second imaging optical systems respectively in which laser beams from the polygon mirror 113 are guided to the outer circumferential surfaces of photosensitive drums 116 and 117 serving as surfaces to be scanned, and uniform spot images are formed at a constant speed on the surfaces to be scanned. Herein, the fθ lenses 111 and 112 are formed to be elongate in the scan direction of laser beams, using a synthetic resin. The photosensitive drums 116 and 117 are formed to have cylindrical shapes extending in the scan direction of laser beams.

The optical system 21 has the completely same configuration as that of the optical system 11 described above, and thus a detailed explanation of the optical system 21 is omitted. In FIGS. 1 to 4, reference numerals 201 and 202 denote light source blocks, reference numeral 213 denotes a polygon mirror, reference numerals 211 and 212 denote fθ lenses, reference numerals 203 and 204 denote semiconductor lasers, reference numerals 205 and 106 denote laser driving substrates, reference numerals 207 and 208 denote collimator lenses, reference numerals 209 and 210 denote plano-convex cylindrical lenses, reference numerals 214 and 215 denote reflecting mirrors, and reference numerals 216 and 217 denote photosensitive drums.

The polygon mirror 113 and the polygon mirror 213 are configured such that they are rotatively driven in mutually opposite directions. More specifically, the polygon mirror 113 rotates in the direction (anticlockwise) indicated by the arrow A shown in FIG. 2 (plan view), and the polygon mirror 213 rotates in the direction (clockwise) indicated by the arrow B shown in FIG. 2.

In FIGS. 1 and 2, reference numeral 120 denotes a synchronization sensor (hereinafter, referred to as "BD sensor" for convenience) serving as an optical detector. The BD sensor 120 is disposed at a starting side in the scan direction on the side of the fθ lens 112. An image of a laser beam deflected by the polygon mirror 113 toward the BD sensor 120 is formed on the BD sensor 120 with a BD sensor lens 123. Further, reference numeral 125 denotes a slit plate, and the slit plate 125 is provided with a slit 121 for letting the laser beam traveling toward the BD sensor 120 pass through only a predetermined zone in the scan direction (see FIG. 5).

With respect to the optical system 21, the BD sensor 120 is disposed in a similar manner at a starting side in the scan direction on the side of the fθ lens 212. An image of a laser beam deflected by the polygon mirror 213 toward the BD sensor 120 is formed on the BD sensor 120 with a BD sensor lens 223. Further, the slit plate 125 is provided with a slit 221 for letting the laser beam traveling from the polygon mirror 213 to the BD sensor 120 pass through only a predetermined zone in the scan direction (see FIG. 5).

In other words, the optical system 11 and the optical system 21, including the directions in which the polygon mirrors 113 and 213 rotate, are arranged so as to be mirror symmetrical (i.e. to form mirror images) with respect to a vertical plane extending through the center of the BD sensor 120.

The only portions that are not mirror symmetrical are the width of the open slit 121 and the width of the open slit 221 provided on the slit plate 125. As shown in FIG. 5, when the width of the open slit 121 is taken as d1 and the width of the open slit 221 is taken as d2, a relationship of d1<d2 is satisfied.

Next, the operation of the thus configured optical scanning device 1 is described with reference to FIGS. 1 to 6. FIG. 6 shows timing charts of synchronization signals of the optical scanning device in this embodiment.

First, the polygon motors in the optical system 11 and the optical system 21 are simultaneously driven in response to signals from an image forming apparatus unit (not shown), so that the polygon mirror 113 rotates in the direction indicated by the arrow A in FIG. 2 and the polygon mirror 213 rotates in the direction indicated by the arrow B in FIG. 2.

Then, in response to the signals from the image forming apparatus unit, the semiconductor laser circuit on the laser driving substrate 106 on the side of the BD sensor 120 in the optical system 11 drives the semiconductor laser 104, and the semiconductor laser 104 emits a laser beam. The laser beam that has been emitted from the semiconductor laser 104 is converted into substantially parallel light with the collimator lens 108, and is further converted, by the plano-convex cylindrical lens 110, into convergent light only in the direction (sub-scan direction) perpendicular to the deflection direction (main-scan direction) of the polygon mirror 113, and is incident on a deflection face of the polygon mirror 113. In this manner, the first imaging optical system constituted by the collimator lens 108 and the plano-convex cylindrical lens 110 is configured so as to form an image of a laser beam on a deflection face of the polygon mirror 113 only in the sub-scan direction, and thus the laser beam is a linear image on the deflection face of the polygon mirror 113.

The laser beam that has been deflected by the polygon mirror 113 is incident on the BD sensor lens 123 and the fθ lens 112 on the scan starting side in this order, and an image thereof is formed as spot light on the BD sensor 120 and a surface to be scanned of the photosensitive drum 117, and is then scanned.

Figure 6A:
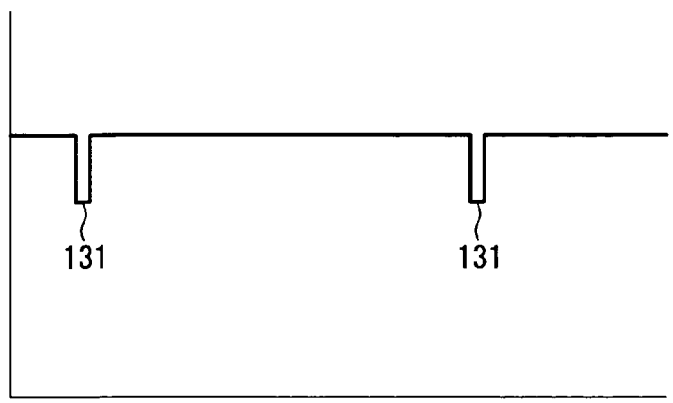
FIG. 6A is a timing chart of synchronization signals with the width corresponding to a width d1 of an open slit in the optical scanning device in the first embodiment of the present invention.

The laser beam that has been deflected toward the BD sensor 120 reaches the BD sensor 120 only while the laser beam passes through the slit 121 on the slit plate 125. Thus synchronization signals 131 with a width corresponding to the width d1 of the open slit 121 are output from the BD sensor 120, as shown in FIG. 6A. The polygon mirror 113 continuously rotates to deflect laser beams by its deflection faces, and thus the synchronization signals 131 are sequentially output. Only two synchronization signals 131 are shown in FIG. 6A, but the synchronization signals 131 are output with constant intervals in a similar manner also after this. The synchronization signals 131 are output to the image forming apparatus unit, and the image forming apparatus unit starts a synchronous control on the semiconductor laser 104. More specifically, the image forming apparatus unit starts a commonly used automatic power control (APC) and off-control of a time during which the surface to be scanned on the photosensitive drum 117 is scanned.

Then, in response to a signal from the image forming apparatus unit, the semiconductor laser circuit on the laser driving substrate 206 on the side of the BD sensor 120 in the optical system 21 drives the semiconductor laser 204, and the semiconductor laser 204 emits a laser beam. The following operation is similar to that in the case of the optical system 11, and thus an explanation thereof is omitted.

Figure 6B:
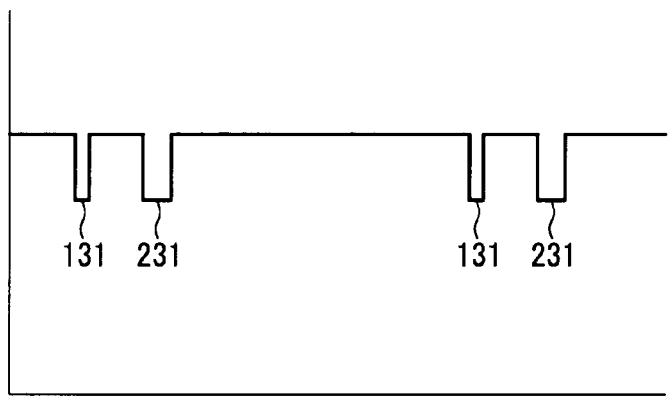
FIG. 6B is a timing chart of synchronization signals with the width corresponding to the width d1 of the open slit, and synchronization signals with the width corresponding to a width d2 of an open slit, in the optical scanning device in the first embodiment of the present invention.

The laser beam that has been deflected toward the BD sensor 120 reaches the BD sensor 120 only while the laser beam passes through the slit 221 on the slit plate 125. Thus synchronization signals 131 with a width corresponding to the width d1 of the open slit 121 and synchronization signals 231 with the width corresponding to the width d2 of the open slit 221 are output from the BD sensor 120 as shown in FIG. 6B.

In this manner, the signal width of the synchronization signals 131 is different from that of the synchronization signals 231, and thus the image forming apparatus unit can determine from which optical system (the optical system 11 or the optical system 21) a signal has been emitted, by confirming the difference in the signal width. Accordingly, it is possible to control the two semiconductor lasers 104 and 204 based on signals from the one BD sensor 120.

When it is impossible to determine from which optical system a signal has been emitted because the synchronization signal 131 and the synchronization signal 231 overlap with each other or they are very close to each other, the two synchronization signals 131 and 231 can be made sufficiently distinguishable from each other, for example, by shifting the phase of any polygon motor for driving the polygon mirror 113 or 213 from the other, or by changing the rotation speed of any polygon motor.

The semiconductor laser 103 can be controlled in the following manner. In other words, the semiconductor laser 103 may be controlled at a timing delayed by a time during which the polygon mirror 113 rotates from the scan starting point of a laser beam from the semiconductor laser 104 to the scan starting point of a laser beam from the semiconductor laser 103, when the laser beam from the semiconductor laser 104 is deflected by any deflection face of the polygon mirror 113 and the laser beam from the semiconductor laser 103 is deflected by the same deflection face. This time is a time which is determined one by one based on, for example, the rotation number of the polygon mirror 113, the number of its deflection faces, and the incidence angle of laser beams. It is understood that the present invention includes optical scanning devices utilizing optical deflectors having any appropriate number of deflection faces.

The semiconductor laser 203 also can be controlled in a similar manner. In other words, the semiconductor laser 203 may be controlled at a timing delayed by a time during which the polygon mirror 213 rotates from the scan starting point of a laser beam from the semiconductor laser 204 to the scan starting point of a laser beam from the semiconductor laser 203, when the laser beam from the semiconductor laser 204 is deflected by any deflection face of the polygon mirror 213 and the laser beam from the semiconductor laser 203 is deflected by the same deflection face.

As described above, according to the configuration of the optical scanning device 1 of this embodiment, the polygon mirror 113 provided in the optical system 11 and the polygon mirror 213 provided in the optical system 21 rotate in mutually opposite directions, and thus the rotation torques during the starting-up and the operation of the two polygon motors for rotatively driving the two polygon mirrors 113 and 213 cancel each other, resulting in reduced vibrations compared with those in conventional cases in which two polygon mirrors rotate in the same direction. Therefore, according to the configuration of the optical scanning device 1 of this embodiment, both a simplification of the device and a reduction of vibrations can be achieved. In addition, the optical system 11 and the optical system 21 share the BD sensor 120, and thus the number of components is reduced, so that both a simplification of the device and a reduction of vibrations further can be achieved.

Figure 7:
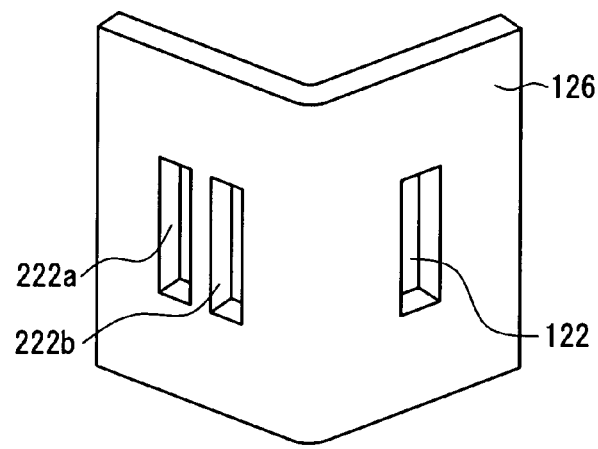
FIG. 7 is a perspective view showing another example of a slit plate used in the optical scanning device in the first embodiment of the present invention.
Figure 8A:
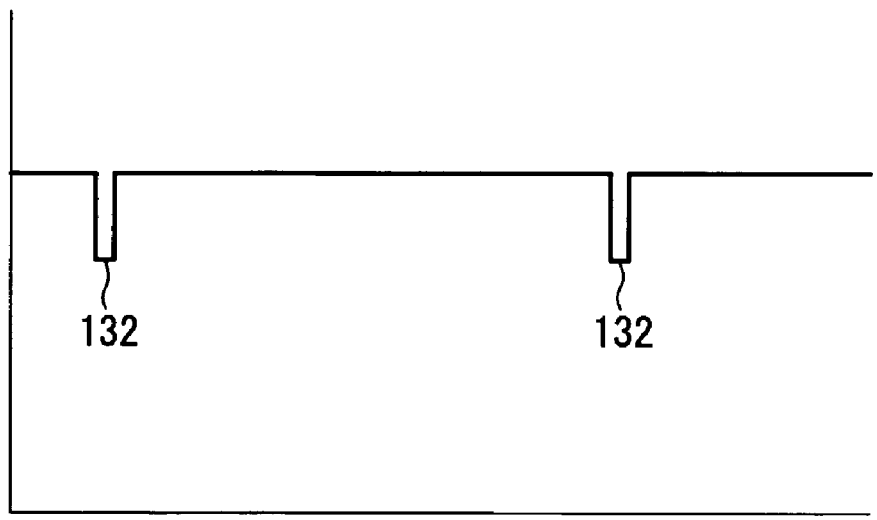
FIG. 8A is a timing chart of synchronization signals with the number corresponding to a case in which the number of open slits is one in the optical scanning device in the first embodiment of the present invention.
Figure 8B:
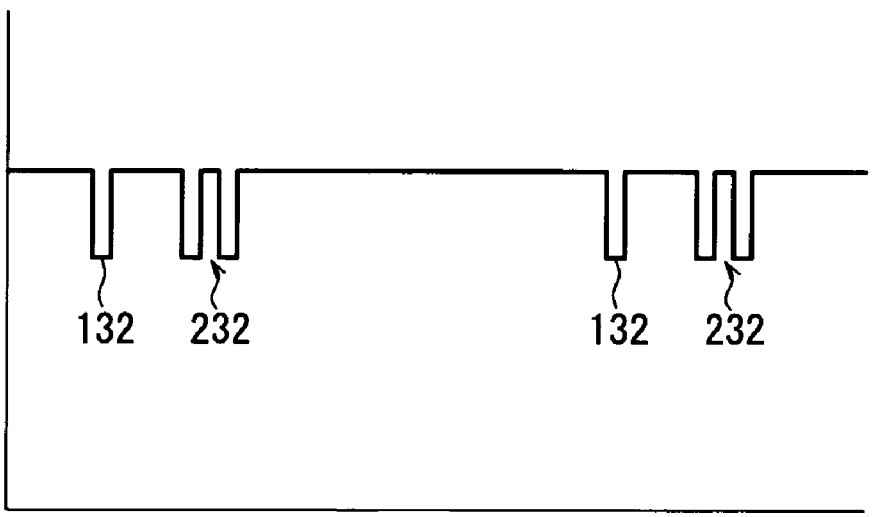
FIG. 8B is a timing chart of synchronization signals with the number corresponding to a case in which the number of open slits is one, and synchronization signals with the number corresponding to a case in which the number of open slits is two, in the optical scanning device in the first embodiment of the present invention.

In this embodiment, the slit plate 125 having the open slit 121 corresponding to the optical system 11 and the open slit 221 corresponding to the optical system 21, whose widths are mutually different, is used, but the configuration of the slit plate is not limited to this. For example, as shown in FIG. 7, a slit plate 126 having a slit 122 corresponding to the optical system 11 and slits 222a and 222b corresponding to the optical system 21 may be used. More specifically, in the slit plate 126, the number of open slits corresponding to the optical system 11 is different from the number of open slits corresponding to the optical system 21. Herein, the width of the open slit 122 is the same as the widths of the open slits 222a and 222b. When the thus configured slit plate 126 is used, output signals from the BD sensor 120 are as shown in FIG. 8. More specifically, for example, a laser beam emitted from the semiconductor laser 104 and deflected toward the BD sensor 120 reaches the BD sensor 120 only while the laser beam passes through the slit 122 on the slit plate 126, and thus synchronization signals 132 with the number corresponding to the number (one) of the open slit 122 are output from the BD sensor 120 as shown in FIG. 8A. Furthermore, for example, a laser beam emitted from the semiconductor laser 204 and deflected toward the BD sensor 120 reaches the BD sensor 120 only while the laser beam passes through the slits 222a or 222b on the slit plate 126, and thus synchronization signals 132 with the number corresponding to the number (one) of the open slit 122 and synchronization signals 232 with the number corresponding to the number (two) of the open slits 222a and 222b are output from the BD sensor 120 as shown in FIG. 8B.

In this manner, the signal number of the synchronization signals 132 is different from that of the synchronization signals 232, and thus the image forming apparatus unit can determine from which optical system (the optical system 11 or the optical system 21) a signal has been emitted, by confirming the difference in the signal number. Of course, the present invention is not limited to one and two slits, but any appropriate different number of slits can be utilized herein.

Hereinafter, as for the unique configuration of the present invention in which two scan lights that are independent of each other and that are asynchronously scanned are incident on the same BD sensor, a structure for solving the problem is described, which is a potential problem induced by the configuration, that the two scan lights cannot be distinguished from each other and thus synchronization signals for forming images respectively corresponding to the scan lights cannot be precisely generated. More specifically, a synchronization signal generating portion (hereinafter, referred to as "BD synchronization signal generating portion" for convenience) is described in which two scan lights that are independent of each other and that are asynchronously scanned are received by one BD sensor and synchronization timing signals for forming images for the respective scan lights are one by one generated and output, in an optical scanning unit that will be described later.

Second Embodiment

An optical scanning unit of this embodiment is provided with light sources emitting two scan lights (first scan light and second scan light) that are independent of each other and that are asynchronously scanned, one BD sensor that is disposed on the scanning line of lights to be scanned and that receives the scan lights, and a light-blocking plate that is disposed in front of the BD sensor and that has a first light-blocking face corresponding to the first scan light and a second light-blocking face corresponding to the second scan light.

Figure 9A:
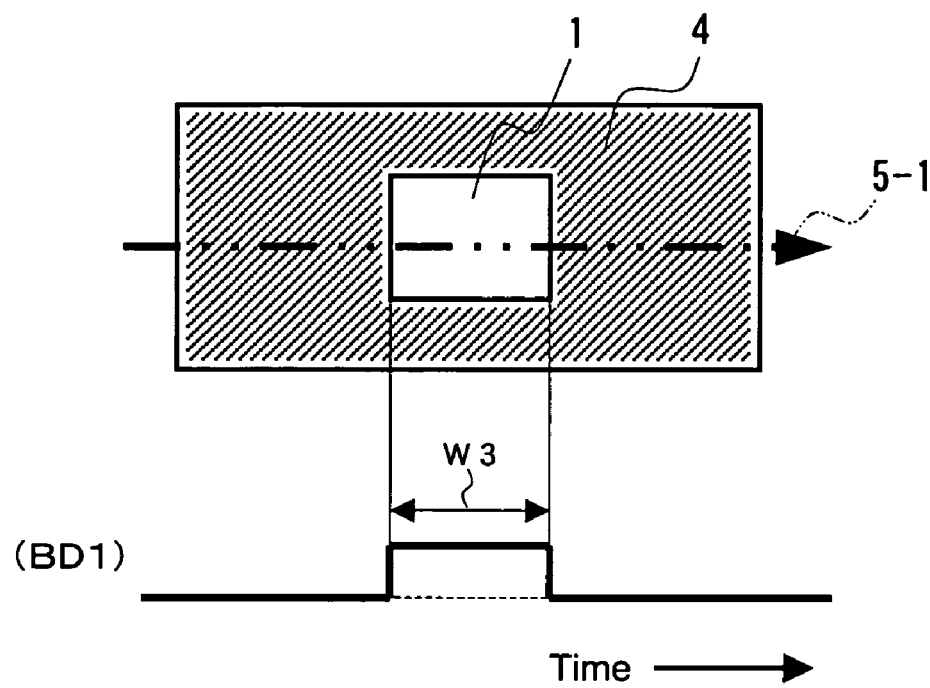
FIG. 9A is a view showing a first light-blocking face used in an optical scanning unit in a second embodiment of the present invention, and the relationship between the width of an open slit on the first light-blocking face in the scan direction of first scan light and an output signal timing of a BD sensor receiving the first scan light that has passed through the slit.
Figure 9B:
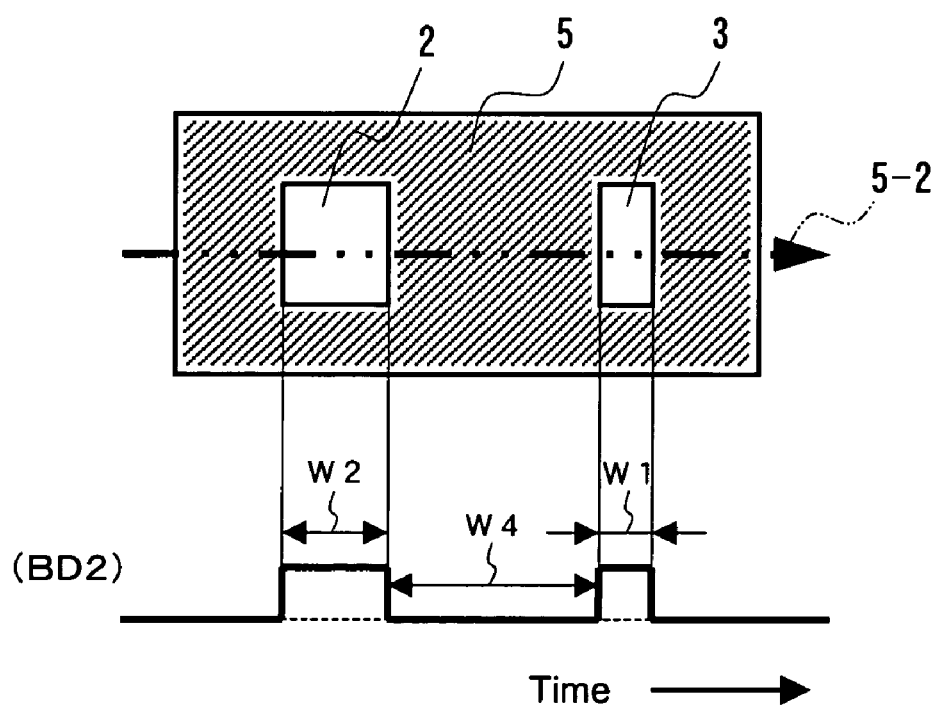
FIG. 9B is a view showing a second light-blocking face used in the optical scanning unit in the second embodiment of the present invention, and the relationship between the width and the interval of open slits on the second light-blocking face in the scan direction of second scan light and an output signal timing of the BD sensor receiving the second scan light that has passed through the slits.

FIG. 9A shows the first light-blocking face used in the optical scanning unit of this embodiment, and the relationship between the width of the open slit on the first light-blocking face in the scan direction of the first scan light and an output signal timing of the BD sensor receiving the first scan light that has passed through the slit. FIG. 9B shows the second light-blocking face used in the optical scanning unit of this embodiment, and the relationship between the width and the interval of the open slits on the second light-blocking face in the scan direction of the second scan light and an output signal timing of the BD sensor receiving the second scan light that has passed through the slits. Herein, reference numerals 5-1 and 5-2 in FIGS. 9A and 9B denote the loci of scan lights corresponding to the light-blocking faces.

As shown in FIGS. 9A and 9B, a first light-blocking face 4 corresponding to the first scan light has a slit 1 that can let light pass through only for this portion, and a second light-blocking face 5 corresponding to the second scan light has slits 2 and 3 that can let light pass through only for these portions. The first light-blocking face 4 and the second light-blocking face 5 have open slits that are mutually different in terms of the width and the interval. More specifically, the first light-blocking face 4 has only the slit 1 with such a width that a time in the output signal timing of a BD sensor 6 (see FIG. 12) is W3, and the second light-blocking face 5 has the slit 2 with such a width that a time at the same timing is W2 and the slit 3 with such a width that a time at the same timing is W1, with an interval therebetween in which a time at the same timing is W4. Herein, the BD sensor 6 is directional in receiving light, and thus scan light from the outside of the light-blocking plate in the scan direction of scan light is not received.

In this embodiment, as for the width and interval of the slits 1 to 3 on the first and the second light-blocking faces 4 and 5, W1, W2, W3, and W4 have the following relationship.

$$W1 < W2 < W3 < W4$$

$$W1 \leq W2 - W1$$

$$W1 \leq W3 - W2$$

$$W1 \leq W4 - W3$$

Furthermore, each size difference between W1, W2, W3, and W4 is set to be greater than an extent that their sizes can be stably identified for the quantization in detecting timings (more specifically, a quantization interval, that is, one period of a circuit clock for detecting timings), which will be described later, even in the rating in which the scan speed of scan light is the highest (the rotation speed of a polygon motor for driving a polygon mirror is the highest).

Figure 10:
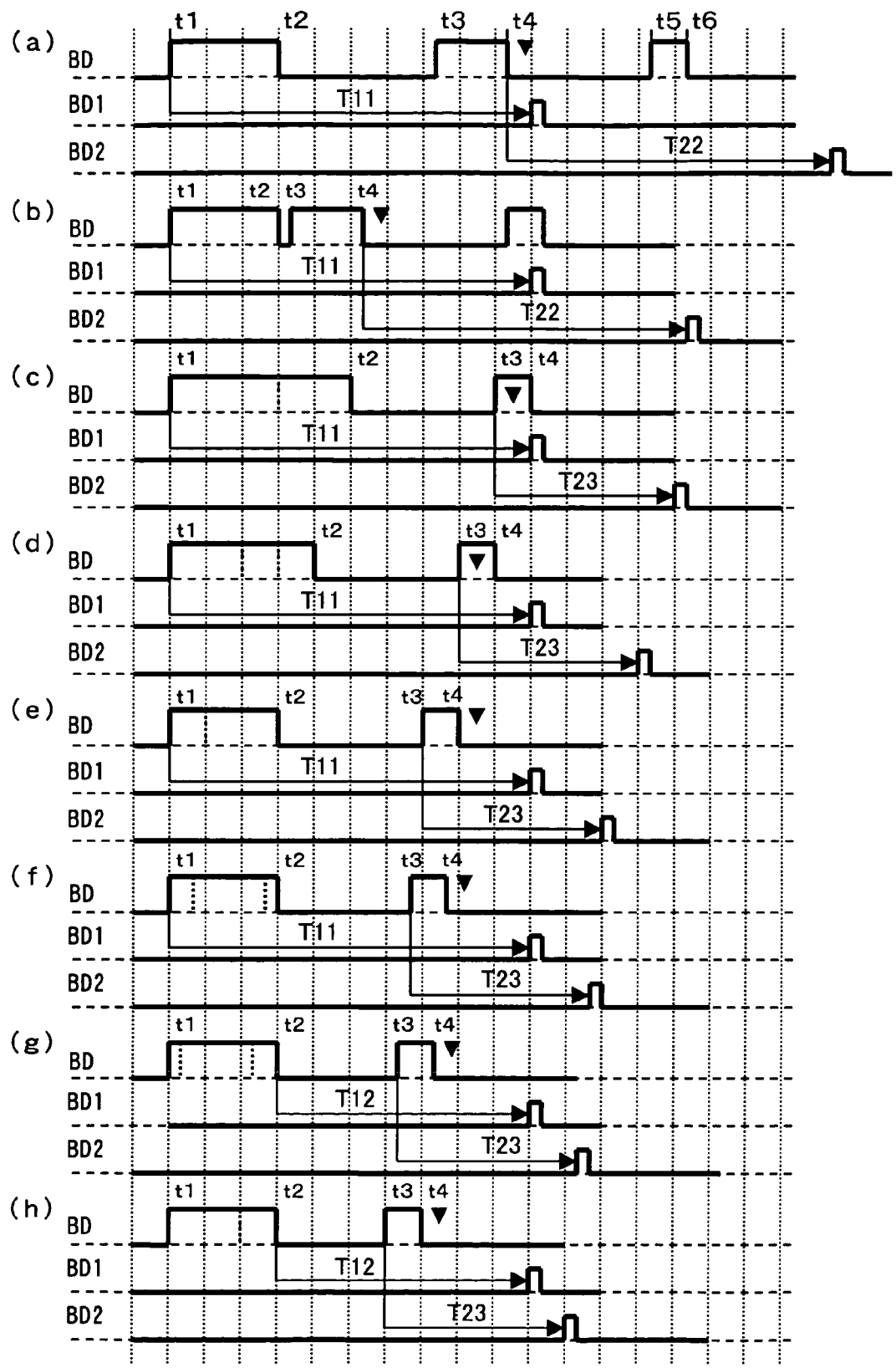
FIG. 10 is a timing chart showing representative examples of an output signal timing of the BD sensor, and a timing of signals output from the optical scanning unit as a synchronization timing for image formation in scanning of the scan lights at that time, in the second embodiment of the present invention.
Figure 11:
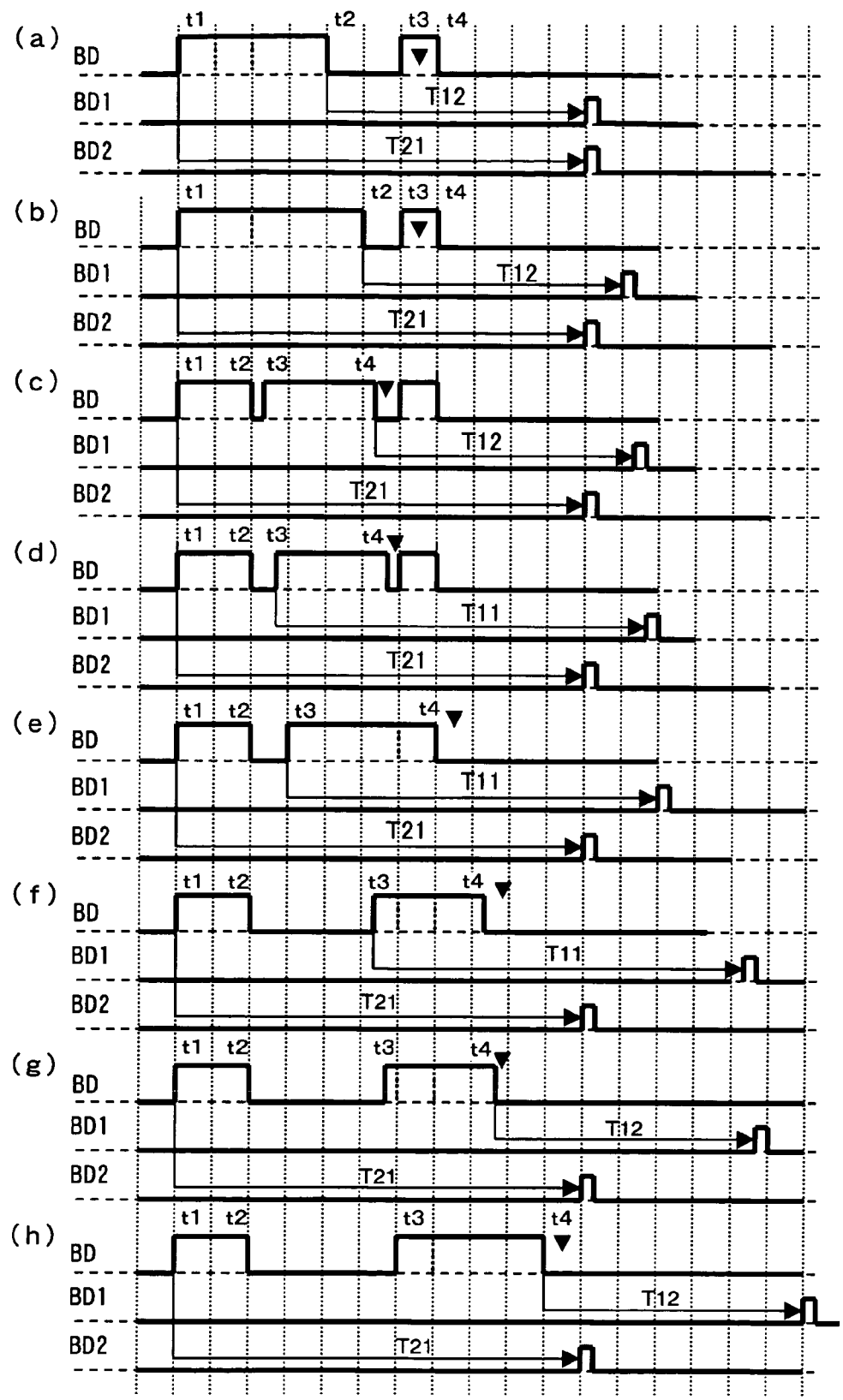
FIG. 11 is a timing chart showing other representative examples of an output signal timing of the BD sensor, and a timing of signals output from the optical scanning unit as a synchronization timing for image formation in scanning of the scan lights at that time, in the second embodiment of the present invention.

FIGS. 10 and 11 show representative examples of an output signal timing (referred to as "BD" in FIGS. 10 and 11), for the case that, of the two scan lights (the first scan light and the second scan light) that are independent of each other and that are asynchronously scanned, the first scan light passes through the first light-blocking face 4 and the second scan light passes through the second light-blocking face 5 and both of them are incident on the same BD sensor 6, and a timing of signals that are output from the optical scanning unit as the synchronization timing for image formation in scanning of the scan lights at that time.

Herein, a synchronization timing for image formation in scanning of the first scan light that passes through the first light-blocking face 4 is referred to as "BD1" and a synchronization timing for image formation in scanning of the second scan light that passes through the second light-blocking face 5 is referred to as "BD2." In FIG. 10, only examples are shown in which BD1 and BD2 are close to each other. Furthermore, in the timing charts (BD charts) of output signals from the BD sensor 6, a first rising time is referred to as "t1", a first falling time as "t2", a subsequent second rising time as "t3", a second falling time as "t4", a subsequent third rising time as "t5", and a third falling time as "t6". Further, the time indicated by the mark ▼ in the drawings shows a time at which timings of BD1 and BD2 are determined, as described below.

FIGS. 10(*a*) and 10(*b*) show that the scan light (the second scan light) relating to BD2 passes through the slit 2 on the second light-blocking face 5 after the scan light (the first scan light) relating to BD1 passes through the slit 1 on the first light-blocking face 4. In this case, it can be determined that the first rising (time t1) corresponds to the front edge of the slit 1 on the first light-blocking face 4 through which the scan light (the first scan light) relating to BD1 passes, and that the second falling (time t4) corresponds to the rear edge of the slit 2 on the second light-blocking face 5 through which the scan light (the second scan light) relating to BD2 passes, based on the timing charts (BD charts) of output signals from the BD sensor 6. FIGS. 10(*a*) and 10(*b*) show that the optical scanning unit generates a signal indicating BD1 after a time T11 using the time t1 as a reference and a signal indicating BD2 after a time T22 using the time t4 as a reference.

FIGS. 10(*c*) to 10(*f*) show that a time at which the scan light (the first scan light) relating to BD1 passes through the slit 1 on the first light-blocking face 4 and a time at which the scan light (the second scan light) relating to BD2 passes through the slit 2 on the second light-blocking face 5 partially overlap each other. In theses cases, it can be determined that the first rising (time t1) corresponds to the front edge of the slit 1 on the first light-blocking face 4 through which the scan light (the first scan light) relating to BD1 passes, and that the second rising (time t3) corresponds to the front edge of the slit 3 on the second light-blocking face 5 through which the scan light (the second scan light) relating to BD2 passes, based on the timing charts (BD charts) of output signals from the BD sensor 6. FIGS. 10(*c*) to 10(*f*) show that the optical scanning unit generates a signal indicating BD1 after the time T11 using the time t1 as a reference and a signal indicating BD2 after a time T23 using the time t3 as a reference.

Further, FIGS. 10(*g*) and 10(*h*) also show that a time at which the scan light (the first scan light) relating to BD1 passes through the slit 1 on the first light-blocking face 4 and a time at which the scan light (the second scan light) relating to BD2 passes through the slit 2 on the second light-blocking face 5 partially overlap each other. In these cases, it can be determined that the first falling (time t2) corresponds to the rear edge of the slit 1 on the first light-blocking face 4 through which the scan light (the first scan light) relating to BD1 passes, and that the second rising (time t3) corresponds to the front edge of the slit 3 on the second light-blocking face 5 through which the scan light (the second scan light) relating to BD2 passes, based on a time (longer than W2) from the first rising (time t1) to the first falling (time t2) and a time (substantially equal to W3) from the first falling (time t2) to the second rising (time t3) in the timing charts (BD charts) of output signals from the BD sensor 6. FIGS. 10(*g*) and 10(*h*) show that the optical scanning unit generates a signal indicating BD1 after a time T12 using the time t2 as a reference and a signal indicating BD2 after the time T23 using the time t3 as a reference.

Further, FIGS. 11(*a*) and 11(*b*) also show that a time at which the scan light (the first scan light) relating to BD1 passes through the slit 1 on the first light-blocking face 4 and a time at which the scan light (the second scan light) relating to BD2 passes through the slit 2 on the second light-blocking face 5 partially overlap each other. In these cases, it can be determined that the first falling (time t2) corresponds to the rear edge of the slit 1 on the first light-blocking face 4 through which the scan light (the first scan light) relating to BD1 passes, and that the first rising (time t1) corresponds to the front edge of the slit 2 on the second light-blocking face 5 through which the scan light (the second scan light) relating to BD2 passes, based on the timing charts (BD charts) of output signals from the BD sensor 6. FIGS. 11(*a*) and (*b*) show that the optical scanning unit generates a signal indicating BD1 after the time T12 using the time t2 as a reference and a signal indicating BD2 after a time T21 using the time t1 as a reference.

FIG. 11(*c*) shows that the scan light (the first scan light) relating to BD1 passes through the slit 1 on the first light-blocking face 4 after the scan light (the second scan light) relating to BD2 passes through the slit 2 on the second light-blocking face 5. In this case, as shown in the timing charts (BD charts) of output signals from the BD sensor 6, a time from the first rising (time t1) to the first falling (time t2) is substantially equal to W2 and a time from the first falling (time t2) to the second rising (time t3) is shorter than half the difference between W4 and W3. Thus, in this case, it can be determined that the second falling (time t4) corresponds to the rear edge of the slit 1 on the first light-blocking face 4 through which the scan light (the first scan light) relating to BD1 passes, and that the first rising (time t1) corresponds to the front edge of the slit 2 on the second light-blocking face 5 through which the scan light (the second scan light) relating to BD2 passes. FIG. 11(*c*) shows that the optical scanning unit generates a signal indicating BD1 after the time T12 using the time t4 as a reference and a signal indicating BD2 after the time T21 using the time t1 as a reference.

Further, FIG. 11(*d*) also shows that the scan light (the first scan light) relating to BD1 passes through the slit 1 on the first light-blocking face 4 after the scan light (the second scan light) relating to BD2 passes through the slit 2 on the second light-blocking face 5. In this case, as shown in the timing charts (BD charts) of output signals from the BD sensor 6, a time from the first rising (time t1) to the first falling (time t2) is substantially equal to W2 and a time from the first falling (time t2) to the second rising (time t3) is longer than half the difference between W4 and W3. Thus, in this case, it can be determined that the second rising (time t3) corresponds to the front edge of the slit 1 on the first light-blocking face 4 through which the scan light (the first scan light) relating to BD1 passes, and that the first rising (time t1) corresponds to the front edge of the slit 2 on the second light-blocking face 5 through which the scan light (the second scan light) relating to BD2 passes. FIG. 11(*d*) shows that the optical scanning unit generates a signal indicating BD1 after the time T11 using the time t3 as a reference and a signal indicating BD2 after the time T21 using the time t1 as a reference.

Further, FIG. 11(*e*) and 11(*f*) also show a case similar to that in FIG. 11(*d*).

Further, FIG. 11(*g*) also shows that the scan light (the first scan light) relating to BD1 passes through the slit 1 on the first light-blocking face 4 after the scan light (the second scan light) relating to BD2 passes through the slit 2 on the second light-blocking face 5. In this case, as shown in the timing charts (BD charts) of output signals from the BD sensor 6, a time from the first rising (time t1) to the first falling (time t2) is substantially equal to W2 and a time from the first falling (time t2) to the second rising (time t3) is longer than W3. Thus, in this case, it can be determined that the second falling (time t4) corresponds to the rear edge of the slit 1 on the first light-blocking face 4 through which the scan light (the first scan light) relating to BD1 passes, and that the first rising (time t1) corresponds to the front edge of the slit 2 on the second light-blocking face 5 through which the scan light (the second scan light) relating to BD2 passes. FIG. 11(*g*) shows that the optical scanning unit generates a signal indicating BD1 after the time T12 using the time t4 as a reference and a signal indicating BD2 after the time T21 using the time t1 as a reference.

FIG. 11(*h*) shows that a time at which the scan light (the first scan light) relating to BD1 passes through the slit 1 on the first light-blocking face 4 and a time at which the scan light (the second scan light) relating to BD2 passes through the slit 3 on the second light-blocking face 5 partially overlap each other. In this case, as shown in the timing charts (BD charts) of output signals from the BD sensor 6, a time from the first falling (time t2) to the second rising (time t3) is substantially equal to W4 and a time from the second rising (time t3) to the second falling (time t4) is longer than W1. Thus, in this case, it can be determined that the second falling (time t4) corresponds to the rear edge of the slit 1 on the first light-blocking face 4 through which the scan light (the first scan light) relating to BD1 passes, and that the first rising (time ti) corresponds to the front edge of the slit 2 on the second light-blocking face 5 through which the scan light (the second scan light) relating to BD2 passes. FIG. 11(*h*) shows that the optical scanning unit generates a signal indicating BD1 after the time T12 using the time t4 as a reference and a signal indicating BD2 after the time T21 using the time t1 as a reference.

Figure 12:
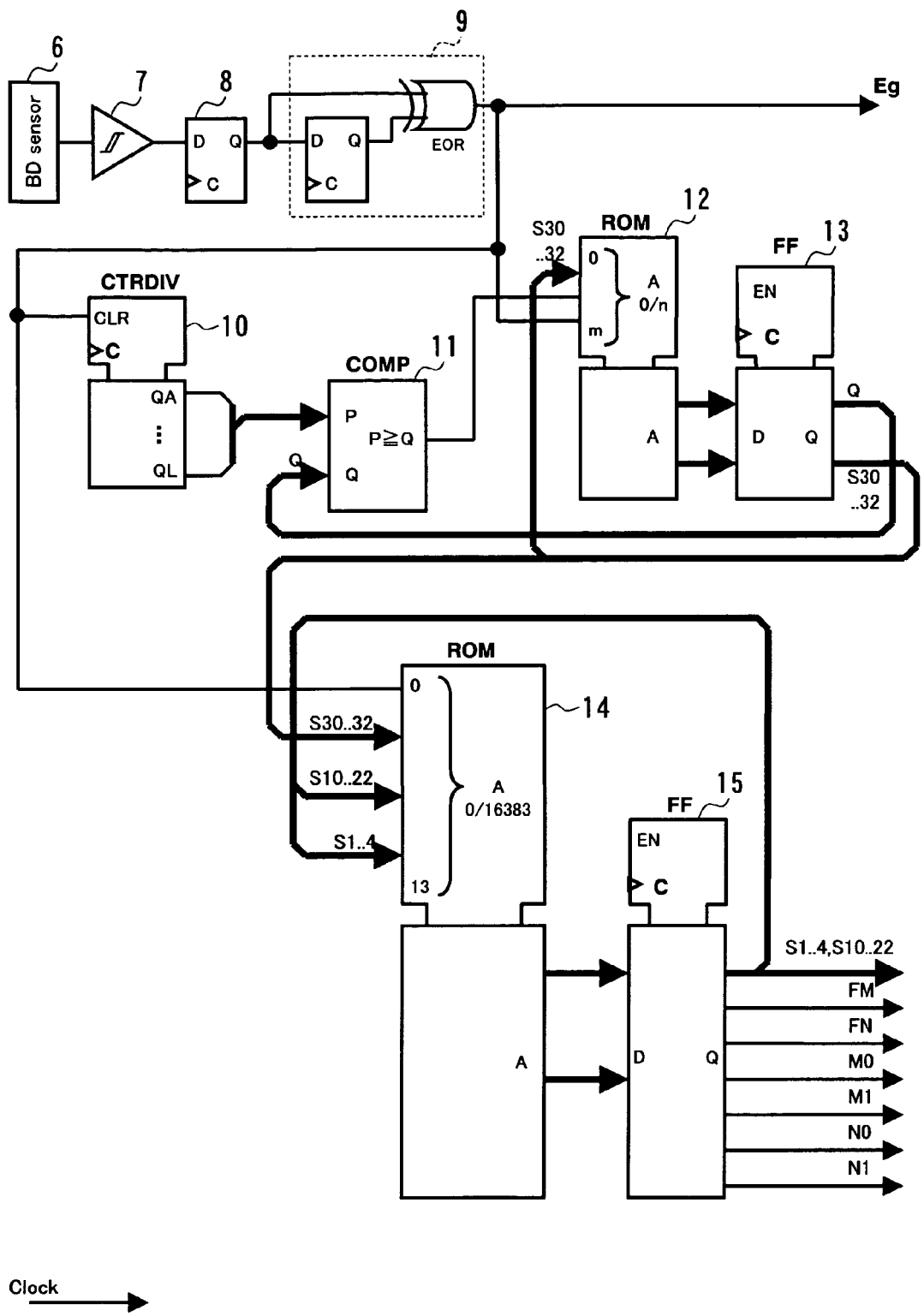
FIG. 12 is a detailed block diagram showing a part of a synchronization signal generating circuit for generating a synchronization timing BD1 for image formation in scanning of the first scan light that passes through the first light-blocking face and a synchronization timing BD2 for image formation in scanning of the second scan light that passes through the second light-blocking face, based on the output signals from the BD sensor in the second embodiment of the present invention.
Figure 13:
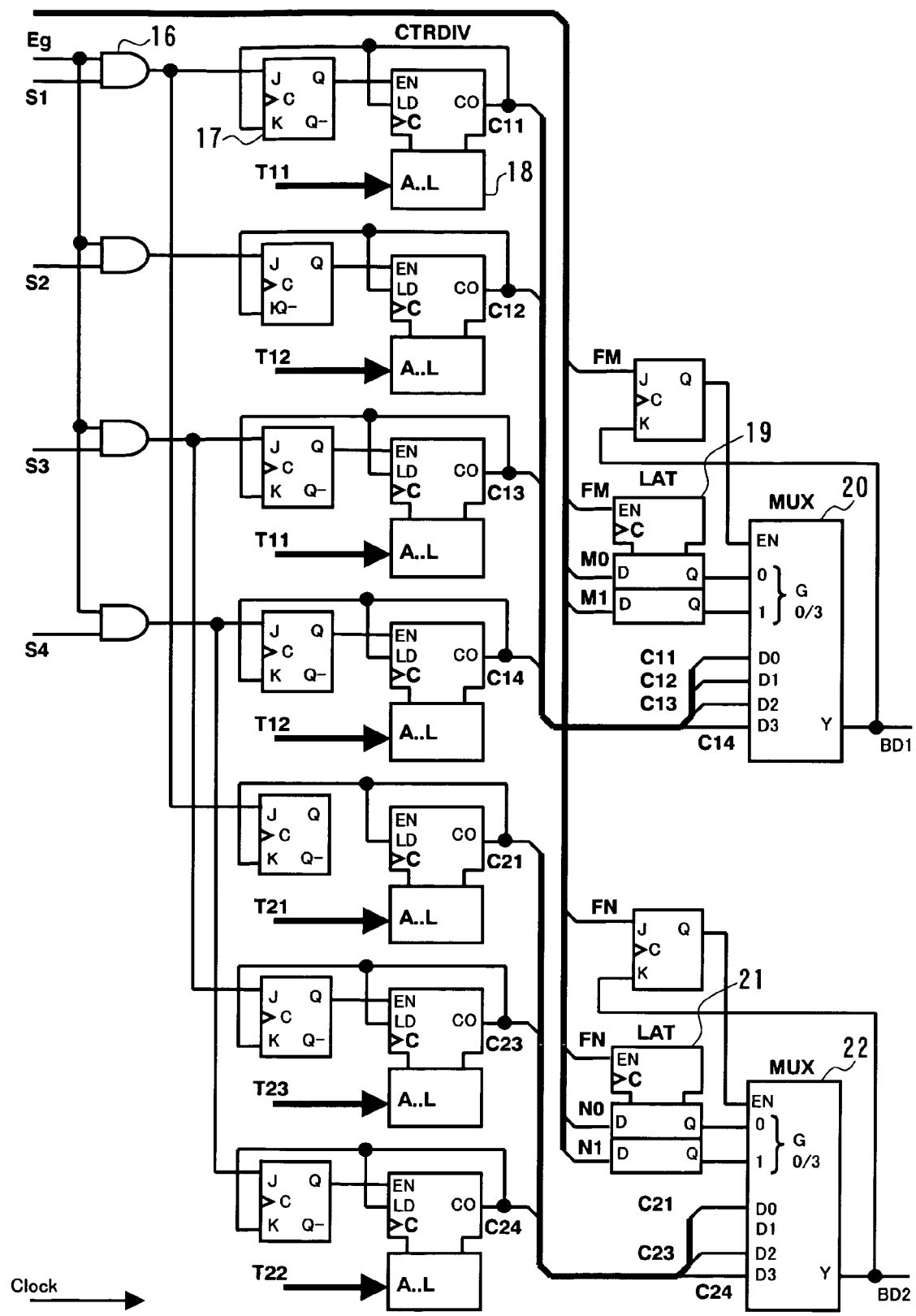
FIG. 13 is a detailed block diagram showing another part of the synchronization signal generating circuit for generating a synchronization timing BD1 for image formation in scanning of the first scan light that passes through the first light-blocking face and a synchronization timing BD2 for image formation in scanning of the second scan light that passes through the second light-blocking face, based on the output signals from the BD sensor in the second embodiment of the present invention.

FIGS. 12 and 13 show detailed block diagrams of a synchronization signal generating circuit (hereinafter, referred to as "BD synchronization signal generating circuit" for convenience) for generating a synchronization timing BD1 for image formation in the scanning of the first scan light that passes through the first light-blocking face 4 and a synchronization timing BD2 for image formation in the scanning of the second scan light that passes through the second light-blocking face 5, based on output signals from the BD sensor 6, for the case that, of the two scan lights (the first scan light and the second scan light) that are independent of each other and that are asynchronously scanned, the first scan light passes through the first light-blocking face 4 and the second scan light passes through the second light-blocking face 5 and both of them are incident on the same BD sensor 6.

First, in FIG. 12, the BD sensor 6 receives scan light that has passed through the slit 1, 2, or 3 on the first light-blocking face 4 or the second light-blocking face 5 in FIGS. 9A and 9B and generates an amount of electricity (voltage) corresponding to the amount of the received light, and the output voltage is low when light is not received and is high when light is received.

A waveform shaping circuit 7 binarizes the voltage output from the BD sensor 6 based on whether the voltage is higher or lower than a predetermined threshold level, and outputs a digital signal "L" indicating a low voltage when the input voltage (the voltage output from the BD sensor 6) is lower than the predetermined threshold level and outputs a digital signal "H" indicating a high voltage when the input voltage is higher than the predetermined threshold level. Accordingly, these digital signals indicate a light receiving state of the BD sensor 6.

Herein, the waveform shaping circuit 7 has a so-called hysteresis characteristic in which, for the binary threshold level based on whether the input voltage is high or low, a value when the output signal changes from "L" to "H" is different from a value when the output signal changes from "H" to "L", and the former value is higher than the latter value.

Furthermore, the waveform shaping circuit 7 may have a function of a digital process (so-called integral process for digital signals) in which it is not recognized that a signal has changed when the duration time is shorter than W1, in a state where the state changes between "H" and "L" in the above-described output of digital signals, in addition to the hysteresis characteristic or instead of the hysteresis characteristic.

With the above-described configuration, it is possible to obtain digital signals without so-called "fluctuations" by absorbing the fluctuations in the change of the output voltage, which are likely to occur when the voltage output from the BD sensor 6 changes from a low voltage to a high voltage or from a high voltage to a low voltage, that is, when the spot of the scan light is on the edge of the slit 1, 2, or 3.

A synchronizing circuit 8 is a D-type flip-flop, and receives and outputs an input digital signal only at a timing of the rising in the signal waveform of an operation clock (Clock) for digital circuit processing in the BD synchronization signal generating circuit such that the digital signal is synchronized with the operation clock (Clock). In the BD synchronization signal generating circuit, the operation of the synchronizing circuit 8 and all subsequent processing circuits are basically synchronized with the operation clock (Clock) (the connection with the operation clock (Clock) is not shown in FIGS. 12 and 13).

Herein, the operation clock (Clock) in the BD synchronization signal generating circuit is set such that the clock period is a time corresponding to the electrical control resolution of pixels in digital image formation. In other words, the synchronization timing for image formation generally synchronizes rasters of a digital image, and the difference in the synchronization timing for each raster appears as the difference between the rasters constituting the digital image. Therefore, it is necessary to set the difference in the synchronization timing for each raster to be shorter than at least a time corresponding to the resolution (the resolution in the direction of optical scanning) in a formed image that is a digital image. Furthermore, in this embodiment, the period of the operation clock (Clock) is set to one sixteenth of a time corresponding to the resolution of the formed image, and the difference between the rasters in the formed image is set to one sixteenth of the resolution even at a maximum.

A differentiation circuit 9 includes a D-type flip-flop and an exclusive OR circuit, and detects the change when the output from the synchronizing circuit 8, that is, the state of a digital signal indicating the light receiving state of the BD sensor 6 changes from "L" to "H" or changes from "H" to "L" (this timing corresponds to a timing of an edge of "H" or "L" in the digital signal indicating the light receiving state of the BD sensor 6, and thus it is referred to as "light receiving edge"). Then, the differentiation circuit 9 outputs a digital signal Eg in which the width is a pulse (state "H") of a time corresponding to the period of the operation clock (Clock) at that time.

A light receiving time counter 10 is a counter sequentially performing a counting operation (incrementing the count value by one) and clearing the count value to 0 (zero) at every pulse output (referred to as "light receiving edge pulse") of the differentiation circuit 9, and measures the duration time of the state "L" or "H" in a digital signal indicating the light receiving state of the BD sensor 6 at the unit of a time corresponding to the period of the operation clock (Clock).

A comparator 11 compares an output value (referred to as "light receiving time count value") P of the light receiving time counter 10 and a predetermined time-related threshold level (referred to as "time threshold level") Q given by a first sequencer (described later) including a first ROM (read-only memory) 12 and a D-type flip-flop 13, and outputs data indicating their size relationship. How the size relationship between P and Q and the output in the comparator 11 correspond to each other is shown in Table 1 below.

TABLE 1

| Comparison object (P) | Comparison value (Q) | Output "H" | "L" |
|---|---|---|---|
| light receiving time count value (output value of the light receiving time counter 10) | Time threshold level | P ≧ Q | P < Q |

Herein, the time threshold level is a time WT01 corresponding to the threshold level for identifying the time W1 in FIG. 9B, a time WT12 corresponding to the threshold level for distinguishing the time W1 from the time W2 in FIG. 9B, a time WT23 corresponding to the threshold level for distinguishing the time W2 from the time W3 in FIGS. 9A and 9B, a time WT34 corresponding to the threshold level for distinguishing the time W3 from the time W4 in FIGS. 9A and 9B, a time WT45 corresponding to the threshold level for identifying the time W4 in FIG. 9B, a time WT56 for identification when the time W3 and the time W1 or W2 are continuous in FIGS. 9A and 9B, or a time WT67 for identifying that a time is equal to or longer than that time.

In this embodiment, the values of WT01, WT12, WT23, WT34, WT45, WT56, and WT67 can be obtained based on the formulas shown in Table 2 below.

TABLE 2

| time threshold level | value |
|---|---|
| WT01 | (0 + W1)/2 |
| WT12 | (W1 + W2)/2 |
| WT23 | (W2 + W3)/2 |
| WT34 | (W3 + W4)/2 |
| WT45 | (W4 + (W2 + W3))/2 |
| WT56 | WT45 + (W1/2) |
| WT67 | WT56 + (W1/2) |

The first ROM 12 and the D-type flip-flop 13 constitute the first sequencer serving as a so-rolled circuit operation sequencer, and update (signal S30 . . . 32 shows the transition state thereof) and give (after advancing the transition state by one) the time threshold levels WT01 to WT67 (Q) to the comparator 11 every time the output from the comparator 11 is "H" (output indicating P≧Q, that is, light receiving time count value≧time threshold level). This sequence operation is constantly repeated taking, as a serial sequence, a period from a time when the digital signal Eg with the state "H" is output from the differentiation circuit 9 to a time when the digital signal Eg with the state "H" is again output, that is, a period (between light receiving edges) until the state of the digital signal indicating the light receiving state of the BD sensor 6 changes from "L" to "H" or changes from "H" to "L".

Herein, in the first sequencer, the D-type flip-flop 13 synchronizes the process result (the data contents of the first ROM 12) corresponding to the input (address input to the first ROM 12) with the operation clock (Clock) for digital circuit processing in the BD synchronization signal generating circuit, and then outputs the process result.

Further, the first ROM 12 is a read-only memory in which the output ("P≧Q" for convenience) from the comparator 11, and Eg and S30 . . . 32 are taken as memory address information bits. The data written in the first ROM 12 and the data read out from the first ROM 12 are as shown in Table 3 below.

TABLE 3

| address (input) | | | data (output) | |
|---|---|---|---|---|
| Eg | P ≧ Q | S30 . . . 32 (x) | S30 . . . 32 | Q |
| 0 | 0 | 0 | 0 | WT01 |
| 0 | 0 | 1 | 1 | WT12 |
| 0 | 0 | 2 | 2 | WT23 |
| 0 | 0 | 3 | 3 | WT34 |
| 0 | 0 | 4 | 4 | WT45 |
| 0 | 0 | 5 | 5 | WT56 |
| 0 | 0 | 6 | 6 | WT67 |
| 0 | 1 | 0 | 1 | WT12 |
| 0 | 1 | 1 | 2 | WT23 |

TABLE 3-continued

| address (input) | | | data (output) | |
|---|---|---|---|---|
| Eg | P ≧ Q | S30 . . . 32 (x) | S30 . . . 32 | Q |
| 0 | 1 | 2 | 3 | WT34 |
| 0 | 1 | 3 | 4 | WT45 |
| 0 | 1 | 4 | 5 | WT56 |
| 0 | 1 | 5 | 6 | WT67 |
| 0 | 1 | 6 | 6 | WT67 |
| 1 | — | X | 0 | WT01 |

S30 . . . 32 and Q in the data (output) field in Table 3 above also serve as names of signals output through the D-type flip-flop 13 for convenience.

Both of Eg and P≧Q in the address (input) field in Table 3 above show the state "H" as "1" and the state "L" as "0" in the signal. S30 . . . 32 is expressed as a value is referred to as "threshold level time code (code)", and the relationship between the threshold level time code and the threshold level time is shown in Table 4 below) obtained by taking the three signals S30, S31, and S32 as a value showing a 3-bit binary number (where S30 is the least significant bit, and S32 is the most significant bit). In Table 3 above, the symbol "–" denotes "0" or "1" and the symbol "x" denotes any value.

Furthermore, in Table 3 above, Q is a value obtained by expressing the threshold level time based on the periodicity of the operation clock (Clock). The number of information bits is determined based on the relationship between the largest time threshold level (WT67) and the operation clock (Clock), and is at least the number of bits that can indicate the value calculated based on the following formula.

WT67÷Clock period

TABLE 4

| threshold level time code(code) | threshold level time |
|---|---|
| 0 | WT01 |
| 1 | WT12 |
| 2 | WT23 |
| 3 | WT34 |
| 4 | WT45 |
| 5 | WT56 |
| 6 | WT67 |

In this embodiment, the configuration is adopted in which the light receiving time count values and the time threshold levels WT01 to WT67 are compared one after another using the comparator 11 and the first sequencer, but the configuration is not limited to this. For example, a configuration may be adopted in which the number of the comparators provided is set to the number of the time threshold levels, so as to compare the light receiving time count values and the time threshold levels WT01 to WT67 in parallel. At that time, a configuration may be adopted in which the values of the time threshold levels WT01 to WT67 are fixed by circuits, that is, the corresponding digital values are respectively formed on circuits and input to the comparators, or a configuration may be adopted in which the time threshold levels WT01 to WT67 are given from the outside (a microprocessor of the image forming apparatus, for example) of the BD synchronization signal generating circuit. When the configuration is adopted in which the time threshold levels are given from the outside, the use is possible, for example, in which the scan speed of the scan light is changed in accordance with the operation mode of the image forming apparatus.

A second ROM 14 and a D-type flip-flop 15 constitute a second sequencer serving as a so-called circuit operation sequencer, and receive the contents of the signal S30 . . . 32 (indicating the maximum time threshold level satisfying a relationship of light receiving time count value≧time threshold level at that time) (the contents are stored in sequence and signal S10 . . . 22 shows the stored contents) to transmit the state (signal S1 . . . 4 shows the transition state) every time the digital signal Eg with the state "H" is output from the differentiation circuit 9, that is, every time the state of the digital signal indicating the light receiving state of the BD sensor 6 changes from "L" to "H" or changes from "H" to "L" (light receiving edge).

When the digital signal Eg with the state "H" is output from the differentiation circuit 9, that is, when the state of the digital signal indicating the light receiving state of the BD sensor 6 changes from "L" to "H" or changes from "H" to "L" (when the light receiving edge is detected), if the contents of the signal S10 . . . 22 and the signal S30 . . . 32 at that time (corresponding to the basis as for the time width in the states "H" and "L" in the digital signal indicating the light receiving state of the BD sensor 6) satisfy the condition for determining BD1 and BD2 (synchronization timings for image formation), a signal Fx indicating that the contents (indicating the type of circuit for generating the synchronization signal for image formation) of the signals M1 and M0, and the signals N1 and N0 are determined is set to "H" by the second sequencer.

Herein, the contents of the signal S10 . . . 12 and the signal S20 . . . 22 (signal S10 . . . 22 ) have received the signal S30 . . . 32 as described above, and the relationship between the values (threshold level time code) obtained by taking these signals as signals indicating binary digits and the threshold level times WT01 to WT67 is as shown in Table 4 above.

Further, the second ROM 14 is a read-only memory in which S1 . . . 4, S10 . . . 22 and S30 . . . 32, and Eg are taken as memory address information bits. The data written in the second ROM 14 and the data read out from the second ROM 14 are as shown in Tables 5A to 5C below.

TABLE 5A

| | address (input) | | | | | data (output) | | | | | | |
|---|---|---|---|---|---|---|---|---|---|---|---|---|
| FIG. | S1 . . . 4 | S10 . . . 12 (z) | S20 . . . 22 (y) | S30 . . . 32 (x) | Eg | S1 . . . 4 | S10 . . . 12 | S20 . . . 22 | M0 . . . 1 | FM | N0 . . . 1 | FN |
| | 0000 | Z | Y | X | — | 1000 | 0 | 0 | 0 | 0 | 0 | 0 |
| | s | Z | Y | 6 . . . | 1 | 1000 | 0 | 0 | 0 | 0 | 0 | 0 |
| | s | Z | Y | 0 . . . 6 | 0 | s | z | y | 0 | 0 | 0 | 0 |
| | s | Z | Y | 7 . . . | 0 | 1000 | 0 | 0 | 0 | 0 | 0 | 0 |
| | 1000 | Z | Y | X | 1 | 0100 | 0 | 0 | 0 | 0 | 0 | 0 |
| | 0100 | Z | Y | . . . 1 | 1 | 1000 | 0 | 0 | 0 | 0 | 0 | 0 |

TABLE 5A-continued

| FIG. | address (input) | | | | | data (output) | | | | | | |
|---|---|---|---|---|---|---|---|---|---|---|---|---|
| | S1...4 | S10...12 (z) | S20...22 (y) | S30...32 (x) | Eg | S1...4 | S10...12 | S20...22 | M0...1 | FM | N0...1 | FN |
| | 0100 | Z | Y | 2...5 | 1 | 0010 | y | x | 0 | 0 | 0 | 0 |
| | 0100 | Z | Y | 6... | 1 | 1000 | 0 | 0 | 0 | 0 | 0 | 0 |
| | 0010 | Z | ...1 | X | 1 | 1000 | 0 | 0 | 0 | 0 | 0 | 0 |
| | 0010 | Z | 2 | ...4 | 1 | 0001 | y | x | 0 | 0 | 0 | 0 |
| | 0010 | Z | 2 | 5... | — | 1000 | 0 | 0 | 0 | 0 | 0 | 0 |
| | 0010 | Z | 3 | ...4 | 1 | 0001 | y | x | 0 | 0 | 0 | 0 |
| | 0010 | Z | 3 | 5... | — | 1000 | | 0 | M11 | 1 | 0 | 0 |
| | 0010 | Z | 4 | ...1 | 1 | 0001 | 4 | x | 0 | 0 | 0 | 0 |

TABLE 5B

| FIG. | address (input) | | | | | data (output) | | | | | | |
|---|---|---|---|---|---|---|---|---|---|---|---|---|
| | S1...4 | S10...12 (z) | S20...22 (y) | S30...32 (x) | Eg | S1...4 | S10...12 | S20...22 | M0...1 | FM | N0...1 | FN |
| 11(a) | 0010 | Z | 4 | 2 | 1 | 0001 | | | M22 | 1 | N11 | 1 |
| | 0010 | Z | 4 | 3 | 1 | 0001 | 4 | 3 | 0 | 0 | 0 | 0 |
| 10(d) | 0010 | Z | 4 | 4 | 1 | 0001 | | | M11 | 1 | N33 | 1 |
| | 0010 | Z | 4 | 5... | 1 | 0001 | 4 | 5 | 0 | 0 | 0 | 0 |
| 11(b) | 0010 | Z | 5 | 0 | 1 | 0001 | 5 | 0 | 0 | 0 | 0 | 0 |
| | 0010 | Z | 5 | 1 | 1 | 0001 | | | M22 | 1 | N11 | 1 |
| | 0010 | Z | 5 | 2 | 1 | 0001 | 5 | 2 | 0 | 0 | 0 | 0 |
| | 0010 | Z | 5 | 3 | 1 | 0001 | 5 | 3 | 0 | 0 | 0 | 0 |
| 10(c) | 0010 | Z | 5 | 4 | 1 | 0001 | | | M11 | 1 | N33 | 1 |
| | 0010 | Z | 5 | 5... | 1 | 0001 | 5 | 5 | 0 | 0 | 0 | 0 |
| | 0001 | ...1 | Y | X | 1 | 1000 | 0 | 0 | 0 | 0 | 0 | 0 |
| | 0001 | 2 | 0 | ...2 | 1 | 1000 | 0 | 0 | 0 | 0 | 0 | 0 |
| 11(c) | 0001 | 2 | 0 | 3 | 1 | 1000 | | | M42 | 1 | N11 | 1 |
| | 0001 | 2 | 0 | 4 | 1 | 1000 | 0 | 4 | 0 | 0 | 0 | 0 |
| | 0001 | 2 | 0 | 5... | 1 | 1000 | 0 | 5 | 0 | 0 | 0 | 0 |
| | 0001 | 2 | 1 | ...2 | 1 | 1000 | 1 | x | — | | — | |
| 11(d) | 0001 | 2 | 1 | 3 | 1 | 1000 | | | M31 | 1 | N11 | 1 |
| 11(e) | 0001 | 2 | 1 | 4 | 1 | 1000 | | | M31 | 1 | N11 | 1 |
| | 0001 | 2 | 1 | 5... | 1 | 1000 | 1 | 5 | | | | |
| | 0001 | 2 | 2 | ...2 | 1 | 1000 | 2 | x | — | | — | |
| | 0001 | 2 | 2 | 3 | 1 | 1000 | | | M31 | 1 | N11 | 1 |
| | 0001 | 2 | 2 | 4... | 1 | 1000 | 2 | x | — | | — | |
| | 0001 | 2 | 3 | ...2 | 1 | 1000 | 3 | x | | | | |

TABLE 5C

| FIG. | address (input) | | | | | data (output) | | | | | | |
|---|---|---|---|---|---|---|---|---|---|---|---|---|
| | S1...4 | S10...12 (z) | S20...22 (y) | S30...32 (x) | Eg | S1...4 | S10...12 | S20...22 | M0...1 | FM | N0...1 | FN |
| 11(f) | 0001 | 2 | 3 | 3 | 1 | 1000 | | | M31 | 1 | N11 | 1 |
| | 0001 | 2 | 3 | 4... | 1 | 1000 | 3 | x | | | | |
| | 0001 | 2 | 4 | 0 | 1 | 1000 | 4 | 0 | | | | |
| | 0001 | 2 | 4 | 1 | 1 | 1000 | 4 | 1 | — | 0 | N11 | 1 |
| | 0001 | 2 | 4 | 2 | 1 | 1000 | 4 | 2 | — | | — | |
| 11(g) | 0001 | 2 | 4 | 3 | 1 | 1000 | 4 | 3 | M42 | 1 | N11 | 1 |
| 11(h) | 0001 | 2 | 4 | 4 | 1 | 1000 | 4 | 4 | M42 | 1 | N11 | 1 |
| | 0001 | 2 | 4 | 5... | 1 | 1000 | 4 | 5 | | | | |
| | 0001 | 2 | 5 | X | 1 | 1000 | 0 | 0 | 0 | 0 | 0 | 0 |
| | 0001 | 3 | 0 | ...1 | 1 | 1000 | 0 | 1 | | | | |
| 10(b) | 0001 | 3 | 0 | 2 | 1 | 1000 | 0 | 2 | M11 | 1 | N42 | 1 |
| | 0001 | 3 | 0 | 3... | 1 | 1000 | 0 | 3 | | | | |
| | 0001 | 3 | 1 | ...1 | 1 | 1000 | 1 | 1 | | | | |
| | 0001 | 3 | 1 | 2 | 1 | 1000 | 1 | 2 | M11 | 1 | N42 | 1 |
| | 0001 | 3 | 1 | 3... | 1 | 1000 | 1 | 3 | | | | |
| | 0001 | 3 | 2 | ...1 | 1 | 1000 | 2 | 1 | | | | |
| | 0001 | 3 | 2 | 2 | 1 | 1000 | 2 | 2 | M11 | 1 | N42 | 1 |
| | 0001 | 3 | 2 | 3... | 1 | 1000 | 2 | 3 | | | | |
| | 0001 | 3 | 3 | 0 | 1 | 1000 | 3 | 0 | | | | |
| 10(g) | 0001 | 3 | 3 | 1 | 1 | 1000 | 3 | 1 | M22 | 1 | N33 | 1 |
| | 0001 | 3 | 3 | 2 | 1 | 1000 | 3 | 2 | M11 | 1 | N42 | 1 |
| | 0001 | 3 | 3 | 3... | 1 | 1000 | 3 | 3 | | | | |
| | 0001 | 3 | 4 | 0 | 1 | 1000 | 4 | 0 | | | | |
| 10(e) | 0001 | 3 | 4 | 1 | 1 | 1000 | 4 | 1 | M11 | 1 | N33 | 1 |

TABLE 5C-continued

| | address (input) | | | | | data (output) | | | | | | |
|---|---|---|---|---|---|---|---|---|---|---|---|---|
| FIG. | S1...4 | S10...12 (z) | S20...22 (y) | S30...32 (x) | Eg | S1...4 | S10...12 | S20...22 | M0...1 | FM | N0...1 | FN |
| 10(a) | 0001 | 3 | 4 | 2 | 1 | 1000 | 4 | 2 | M11 | 1 | N42 | 1 |
| | 0001 | 3 | 4 | 3... | 1 | 1000 | 4 | 3 | — | | — | |

In Tables 5A to 5C above, S1 . . . 4 shows the state "H" as "1" and the state "L" as "0" (shown by so-called binary digits, and "b" is added to the end of the binary digits in this specification) in the signals S1, S2, S3 and S4, and the symbols "s" denotes any state.

Further, in Tables 5A to 5C above, S10 . . . 12, S20 . . . 22, and S30 . . . 32 are expressed as values (this values correspond to "threshold level time codes (codes)", and the relationship between the threshold level time code and the threshold level time is as shown in Table 4 above) obtained by taking the three signals as values showing 3-bit binary numbers (where S10, S20, and S30 are the least significant bits, and S12, S22, and S32 are the most significant bits). In Tables 5A to 5C above, the symbols "x", "y", and "z" denote any value. Furthermore, the expression, such as "3 . . . ", accompanied by ". . . " denotes, for example, a value (integer) of not less than 3.

The symbols "x", "y", and "z" in S10 . . . 12, and S 20 . . . 22 in the data (output) field in Tables 5A to 5C above correspond to the same symbols as in the address (input) field in the same lines, and the corresponding input values become the output values.

Eg, FM and FN in Tables 5A to 5C above show the state "H" as "1" and "L" as "0" in the signal. "1" in FM indicates that BD1 is detected in the digital signal indicating the light receiving state of the BD sensor 6 and can be output, and "1" in FN indicates that BD2 is detected in the digital signal indicating the light receiving state of the BD sensor 6 and can be output.

In Tables 5A to 5C above, M0 . . . 1 and N0 . . . 1 are values (codes) obtained by taking the two signals as values showing 2-bit binary numbers (where M0 and N0 are the least significant bits, and M1 and N1 are the most significant bits), and the mnemonic (symbols) M11, M22, M31, M42, M11, N33 and N42 are code values indicating the timings shown in Table 6 below.

TABLE 6

| M0...1/N0...1 | | synchro- | timing element | | synchro- |
|---|---|---|---|---|---|
| mnemonic (symbol) | value(code) | nization timing | trigger time | delay time | nization signal |
| M11 | 0 | BD1 | t1 | T11 | C11 |
| M22 | 1 | | t2 | T12 | C12 |
| M31 | 2 | | t3 | T11 | C13 |
| M42 | 3 | | t4 | T12 | C14 |
| N11 | 0 | BD2 | t1 | T21 | C21 |
| N33 | 2 | | t3 | T23 | C23 |
| N42 | 3 | | t4 | T22 | C24 |

In Table 6 above, the trigger time as the timing element is a time serving as a reference in generating the synchronization timing BD1 or BD2 for image formation, which is detected in the digital signal indicating the light receiving state of the BD sensor 6. In the same field, t1 denotes a time at which a first light receiving edge is detected, t2 denotes a time at which a second light receiving edge is detected, t3 denotes a time at which a third light receiving edge is detected, and t4 denotes a time at which a fourth light receiving edge is detected, in a series of processes in the detection. These symbols t1 to t4 match the symbols in FIGS. 10 and 11.

In Table 6 above, the delay time as the timing element indicates a time from the above-described trigger time to the synchronization timing BD1 or BD2, and the symbols T11, T12, T21, T22, and T23 in the same field match the symbols in FIGS. 10 and 11.

The symbols such as C11 in the synchronization signal field in Table 6 above denote signals (described later) in the block diagram in FIG. 13.

Next, in FIG. 13, an AND gate 16 detects the trigger time t1 in the above-described synchronization timing, and detects the light receiving edge and sets the output of a JK-type flip-flop 17 in the next stage to "H" in a transition state in which the signal S1 in the second ROM 14 (FIG. 12) is "H" ("1").

A counter 18 secures the delay time T11 in the above-described synchronization timing. A complement with the value corresponding to the time T11 (Table 6) having the unit of the period of the operation clock (Clock) is loaded as a discrete value in advance in the counter 18. The counter 18 adds the discrete value in every period of the operation clock (Clock) while the output of the JK-type flip-flop 17 is "H", and changes the signal C11 to "H" and resets the output of the JK-type flip-flop 17 to "L" when the discrete value becomes "−1". Consequently, the adding operation is stopped.

As described above, the counter 18 starts the counting (addition) at the trigger time t1, and generates the above-described synchronization timing M1 by changing the signal C11 to "H" after the delay time T11. In this case, the signal C11 is the synchronization signal indicating the synchronization timing M11.

The timings M22, M31, M42, N11, N33, and N42 shown in Table 6 above are generated, and the synchronization signals C12, C13, C14, C21, C23, and C24 indicating the timings are obtained, based on a similar configuration to the configuration including the AND gate 16, the JK-type flip-flop 17, and the counter 18.

A latch 19 indicates the synchronization timing when the signal FM is in the state "H" (it is indicated that BD1 is detected in the digital signal indicating the light receiving state of the BD sensor 6 and can be output), and latches (retains) the signal M0 . . . 1 (M11, M22, M31, or M42) output from the second sequencer also while the signal FM is in the state "L".

A data selector 20 selects one of C11, C12, C13, and C14 in accordance with the latched signal, and outputs it as the signal BD1.

In a similar manner, a latch 21 indicates the synchronization timing when the signal FN is in the state "H" (it is indicated that BD2 is detected in the digital signal indicating the light receiving state of the BD sensor 6 and can be output), and latches (retains) the signal N0 . . . 1 (N11, N33, or N42) output from the second sequencer also while the signal FN is in the state "L". A data detector 22 selects one of C21, C23, and C24 in accordance with the latched signal, and outputs it as the signal BD2.

Next, the operation of generating the BD synchronization signals in the thus configured BD synchronization signal generating circuit will be described.

In the optical scanning unit of this embodiment, the first scan light and the second scan light are scanned simultaneously and asynchronously, and thus the output signal timing of the BD sensor 6 receiving these scan lights varies as shown in FIGS. 10 and 11. Herein, the operation of generating the BD synchronization signals is described taking as an example a case in which the timing is as shown in FIG. 10(f).

Figure 14:
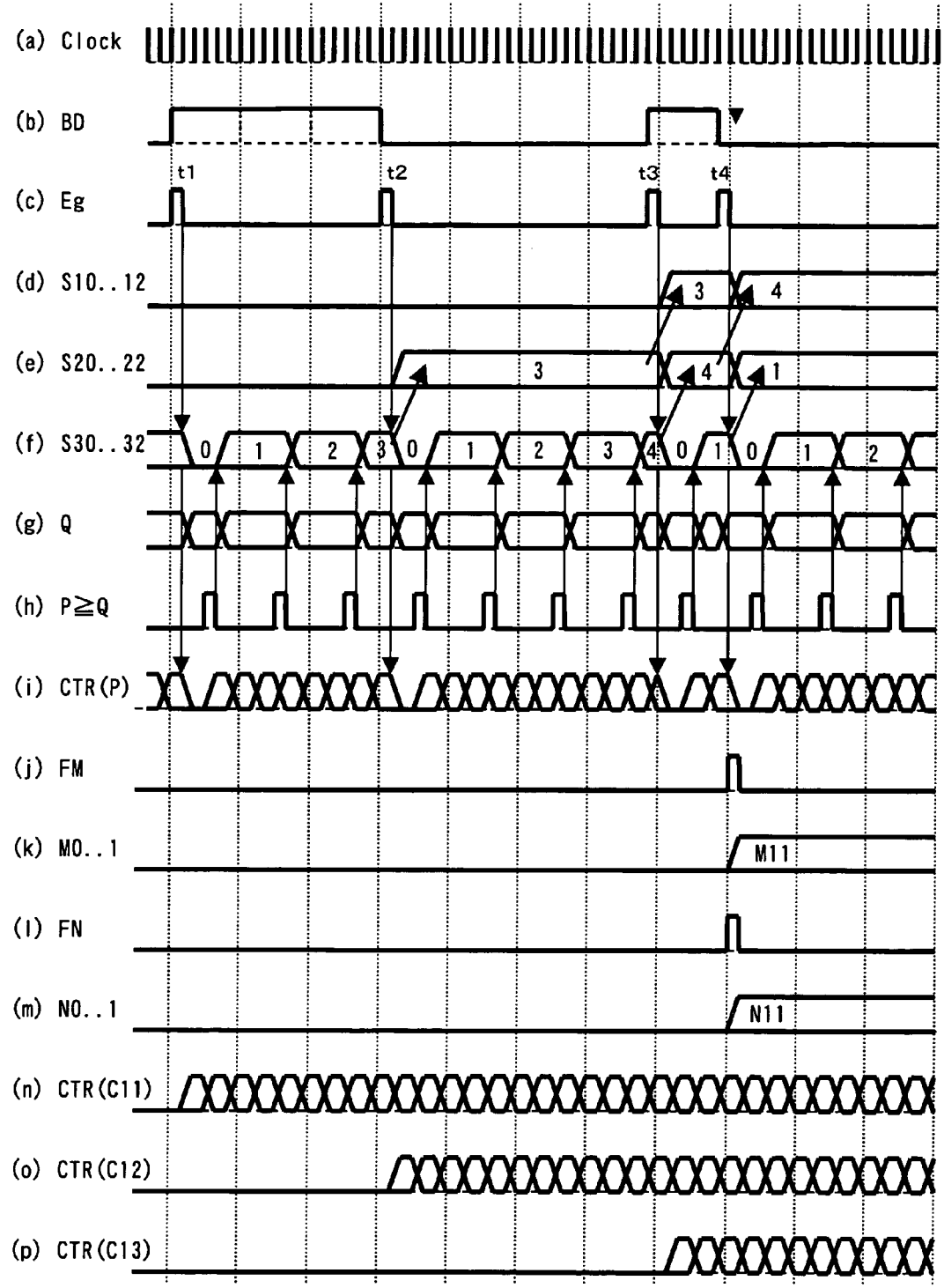
FIG. 14 is a timing chart of main signals in generating BD synchronization signals in the second embodiment of the present invention.

FIG. 14 shows a timing chart of main signals in generating the BD synchronization signals in a case in which the output signal timing of the BD sensor 6 is as shown in FIG. 10(f).

FIG. 14(a) is a timing chart of the operation clock (Clock) signals. All signals in FIG. 14 change their states in synchronization with the rising in the timing waveform of the operation clock signals.

In the BD synchronization signal generating circuit, the output signals from the BD sensor 6 having received scan light are input into the waveform shaping circuit 7 and are changed into digital signals without so-called fluctuations in the waveform shaping circuit 7, and are then synchronized with the rising in the timing waveform of the operation clock (Clock) signals (FIG. 14(a)) through the synchronizing circuit 8. FIG. 14(b) is a timing chart of the signals BD in which the output signals from the BD sensor 6 are waveform-shaped and synchronized with the operation clock signals.

In the BD synchronization signal generating circuit, the differentiation circuit 9 detects that the state of the signals BD (FIG. 14(b)) synchronized with the operation clock signals changes from "L" to "H" or changes from "H" to "L", and generates the light receiving edge pulse (referred to as "light receiving edge pulse t1" for convenience) based on the timing t1 shown in FIG. 14(c) as the light receiving edge signals Eg.

The first ROM 12 constituting the first sequencer receives the light receiving edge pulse t1, and then, as shown in Table 3 above, clears the value of the output S30 . . . 32 to 0 (zero) and resets, to WT01, the value (corresponding to the threshold level time) given to the input port Q of the comparator 11. Subsequently, these values are output through the D-type flip-flop 13 at the next operation clock timing (at the next rising in the timing waveform of the operation clock (Clock) signals).

On the other hand, the light receiving time counter 10 sequentially updates the count value by performing a count operation in every period of the operation clock. When receiving the light receiving edge pulse t1, the light receiving time counter 10 clears the count value given to the input port P of the comparator 11 to 0 (zero) at the next operation clock timing.

At that time, the value (0) of the input port P is smaller than the value (WT01) of Q (P<Q), and thus the comparator 11 outputs "L" as shown in Table 1 above.

Then, the light receiving time counter 10 updates the count value by performing the count operation in every period of the operation clock. Also during this time, the comparator 11 compares the updated count value and the value (WT01 at this point of the explanation) given to the input port Q of the comparator 11, and outputs the state (stays to be "L" at this point) shown in Table 1 above.

At that time, according to the first ROM 12, the values of the input [Eg, P≧Q, S30 . . . 32] are [0, 0, 0], so that the values of the output [S30 . . . 32, Q] corresponding to the input are [0, WT01] as shown in Table 3 above, and thus the state in which the value of S30 . . . 32 is 0 is continued.

Subsequently, when the count value of the light receiving time counter 10 becomes WT01, the comparator 11 outputs "H" as shown in Table 1 above because the value of the input port P is equal to the value (WT01) of Q at that time. Thus, according to the first ROM 12, the values of the input [Eg, P≧Q, S30 . . . 32] are [0, 1, 0], so that the values of the output [S30 . . . 32, Q] corresponding to the input are [1, WT12] as shown in Table 3 above, and thus the state is transited to that in which the value of S30 . . . 32 is 1 at the next operation clock timing. Then, the value given to the input port Q is WT12, and the comparator 11 again outputs "L".

Subsequently, the light receiving time counter 10 continues to update the count value by performing the count operation in every period of the operation clock, and the comparator 11 outputs "H" when the count value becomes WT12 in a similar manner to the above. Thus, according to the first ROM 12, the values of the input [Eg, P≧Q, S30 . . . 32] are [0, 1, 1], so that the values of the output [S30 . . . 32, Q] corresponding to the input are [2, WT23] as shown in Table 3 above, and thus the state is transited to that in which the value of S30 . . . 32 is 2 at the next operation clock timing.

Subsequently, the similar operation is repeated to transit to a state in which the value of the output S30 . . . 32 of the first sequencer is 3.

Then, in this state, when the light receiving edge pulse t2 of the timing t2 shown in FIG. 14(c) is received while the light receiving time counter 10 continues to update the count value by performing the count operation in every period of the operation clock, according to the first ROM 12, the values of the input [Eg, P≧Q, S30 . . . 32] are [1, 0, 2], so that the values of the output [S30 . . . 32, Q] corresponding to the input are [0, WT01] as shown in Table 3 above, and thus the state is transited to that in which the value of S30 . . . 32 is 0 (zero) at the next operation clock timing. In addition, the first ROM 12 resets the value (corresponding to the threshold level time) given to the input port Q of the comparator 11 to WT01. The light receiving time counter 10 clears the count value given to the input port P of the comparator 11 to 0 (zero).

At that time, the value (0) of the input port P is smaller than the value (WT01) of Q (P<Q), so that the comparator 11 outputs "L" as shown in Table 1 above.

On the other hand, according to the second ROM 14, in every scan period of scan light, after a serious of operation from a time when the BD sensor 6 receives scan light to a time when the synchronization timing BD1 or BD2 for image formation is generated, when a time from the last light receiving edge pulse exceeds the threshold level time WT67, the value of S30 . . . 32 output by the first ROM 12 is 7, and the values of input [S1 . . . 4, S10 . . . 12, S20 . . . 22, S30 . . . 32, Eg] are [s, z, y, 7, 0] (s, z, and y can take any value), so that the values of the output [S1 . . . 4, S10 . . . 12, S20 . . . 22, M0 . . . 1, FM, N0 . . . 1, FN] corresponding to the input are [1000b, 0, 0, 0, 0, 0, 0] as shown in Tables 5A to 5C above, and then the state is kept until the next light receiving edge pulse is received after the next operation clock timing.

Then, according to the second ROM 14, when the subsequent light receiving edge pulse t1 is received, the values of the input [S1 . . . 4, S10 . . . 12, S20 . . . 22, S30 . . . 32, Eg] are [1000b, z, y, x, 1], so that the values of the output [S1 . . . 4, S10 . . . 12, S20 . . . 22, M0 . . . 1, FM, N0 . . . 1, FN] corresponding to the input are [0100b, 0, 0, 0, 0, 0, 0] as shown in Tables 5A to 5C above.

Subsequently, when the light receiving edge pulse t2 is received, the value of S30 . . . 32 is 3 in this embodiment (see FIGS. 14(c) and 14(f)). Therefore, according to the second ROM 14, the values of the input [S1 . . . 4, S10 . . . 12, S20 . . . 22, S30 . . . 32, Eg] are [0100b, z, y, 3, 1], so that the output [S1 . . . 4, S10 . . . 12, S20 . . . 22, M0 . . . 1, FM, N0 . . . 1, FN] corresponding to the input are [0010b, y, 3, 0, 0, 0, 0] as shown in Tables 5A to 5C above, and the value of S20 . . . 22 is 3.

When the above-described operation is repeated and the light receiving edge pulse t3 is received, the interval time from the light receiving edge pulse t2 to the light receiving edge pulse t3 is at least the interval time WT45 in this embodiment. Therefore, according to the second ROM 14, the values of the input [S1 . . . 4, S10 . . . 12, S20 . . . 22, S30 . . . 32, Eg] are [0010b, z, 3, 4, 1], and thus the values of the output [S1 . . . 4, S10 . . . 12, S20 . . . 22, M0 . . . 1, FM, N0 . . . 1, FN] corresponding to the input are [0001b, 3, 4, 0, 0, 0, 0] as shown in Tables 5A to 5C above.

As described above, the first ROM 12 operates to measure the interval time between the light receiving edges, and the value of the output S30 . . . 32 at the timing of a light receiving edge indicates the code value corresponding to the interval time with the immediately preceding light receiving edge. On the other hand, the second ROM 14 operates to follow the measured interval time between the light receiving edges at the timing of a light receiving edge, such that the value of the output S30 . . . 32 of the first ROM 12 is the value of the output S20 . . . 22 of the second ROM 14. Further, at the same timing, the value of the output S20 . . . 22 of the second ROM 14 (the value of the secondly preceding output S30 . . . 32, that is, the code value corresponding to the interval time with the secondly preceding light receiving edge) becomes the value of the output S10 . . . 12 of the second ROM 14.

The values of the output S10 . . . 12 and S20 . . . 22 of the second ROM 14 are respectively input as the values of the input S10 . . . 12 and S20 . . . 22 of the second ROM 14, and are received into the second ROM 14 at the next timing of a light receiving edge.

With a similar operation, when the light receiving edge pulse t4 is received, the interval time from the light receiving edge pulse t3 to the light receiving edge pulse t4 is at least the interval time WT12 in this embodiment. Therefore, according to the second ROM 14, the values of the input [S1 . . . 4, S10 . . . 12, S20 . . . 22, S30 . . . 32, Eg] are [0001b, 3, 4, 1, 1], and thus the values of the output [S1 . . . 4, S10 . . . 12, S20 . . . 22, M0 . . . 1, FM, N0 . . . 1, FN] corresponding to the input are [1000b, 4, 1, M11, 1, N33, 1] as shown in Tables 5A to 5C above, and these values (states) are output from the D-type flip-flop 15 in the next operation clock timing.

Herein, this time point is the time point indicated by the mark ▼ in FIG. 10(f).

The value (state) of the signal FM is 1, so that the value (M11) of the signal M0 . . . 1 is set for the latch 19 and the data selector 20 outputs the signal C11 as the signal BD1 as shown in Table 6 above. Furthermore, the value (state) of the signal FN is also 1, so that the value (N33) of the signal N0 . . . 1 is set for the latch 21 and the data selector 22 outputs the signal C23 as the signal BD2 as shown in Table 6 above.

Herein, the signal C11 is a light receiving edge pulse when the signal S1 is in the state "H", that is, a pulse signal generated when the delay time T11 has elapsed after the time of the light receiving edge pulse t1. The timing of this pulse corresponds to the synchronization timing BD1 for image formation as shown in FIG. 10(f). Furthermore, the signal C23 is a light receiving edge pulse when the signal S3 is in the state "H", that is, a pulse signal generated when the delay time T23 has elapsed after the time of the light receiving edge pulse t3. The timing of this pulse corresponds to the synchronization timing BD2 for image formation as shown in FIG. 10(f).

As described above, according to this embodiment, even in the configuration in which two scan lights that are independent of each other and that are asynchronously scanned are incident on the same BD sensor 6, it is possible to distinguish the scan lights from each other to precisely generate a synchronization signal for forming an image with respect to each scan light, by analyzing the timing waveforms of the output signals from the BD sensor 6.

Furthermore, this embodiment has been described using, as an example, the case in which two scan lights are used. However, also as for the case in which three or more scan lights are used, it is possible to distinguish the scan lights from each other to precisely generate a synchronization signal for forming an image with respect to each scan light, by using three or more light-blocking faces having open slits with mutually different combinations of the width, number, and interval, and by analyzing the timing waveforms of the output signals from the BD sensor 6, in a similar manner to that in this embodiment.

Furthermore, a method in which logic information is directly processed in an electronic circuit is used in order to analyze the timing waveforms of the output signals from the BD sensor 6 in this embodiment. However, it is also possible to analyze the timing waveforms of the output signals from the BD sensor 6 in a similar process method using a microprocessor, for example.

Third Embodiment

In a similar manner to that in the second embodiment above, an optical scanning unit of this embodiment is provided with light sources emitting two scan lights (first scan light and second scan light) that are independent of each other and that are asynchronously scanned, one BD sensor that is disposed on the scanning line of lights to be scanned and that receives the scan lights, and a light-blocking plate that is disposed in front of the BD sensor and that has a first light-blocking face corresponding to the first scan light and a second light-blocking face corresponding to the second scan light.

Figure 15A:
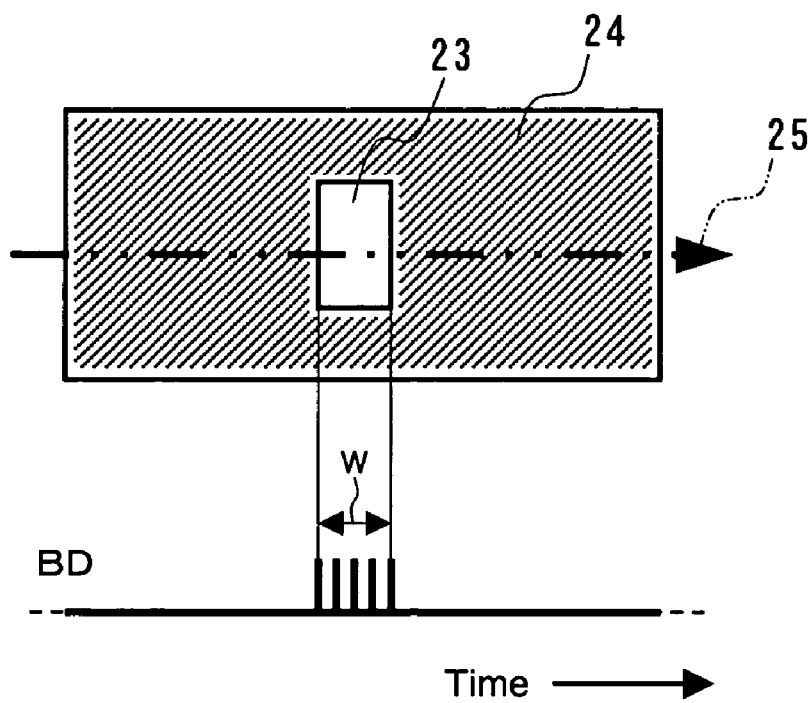
FIG. 15A is a view showing a first and a second light-blocking face used in an optical scanning unit in a third embodiment of the present invention, and the relationship between the width of an open slit on the first and the second light-blocking faces in the scan direction of scan light and an output signal timing of a BD sensor receiving the scan light that has passed through the slit.
Figure 15B:
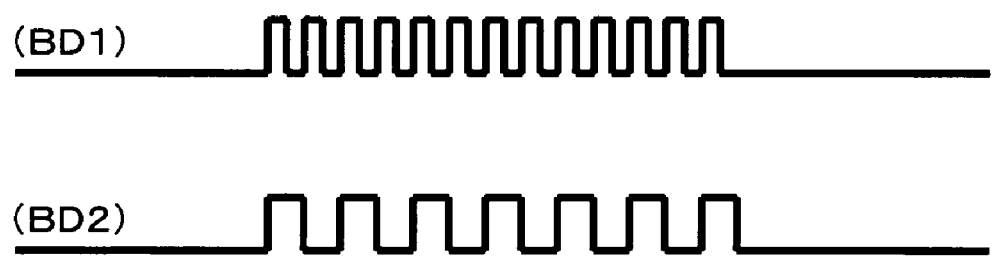
FIG. 15B is a view showing an output signal (BD1) of the BD sensor when receiving first scan light driven with a synchronizing signal SD1 and an output signal (BD2) of the BD sensor when receiving second scan light driven with a synchronizing signal SD2 in the third embodiment of the present invention.

FIG. 15A shows the first and the second light-blocking faces used in the optical scanning unit of this embodiment, and the relationship between the width of the open slit on the first and the second light-blocking faces in the scan direction of the scan light and an output signal timing of the BD sensor receiving the scan light that has passed through the slit. FIG. 15B shows an output signal (BD1) of the BD sensor when receiving the first scan light driven with a synchronizing signal, and an output signal (BD2) of the BD sensor when receiving the second scan light driven with a synchronizing signal. Herein, 25 in FIG. 15A denotes the locus of scan light corresponding to the first and the second light-blocking faces.

As shown in FIG. 15A, a first and a second light-blocking face 24 have slit 23 that can let light pass through only for these portions. In this manner, in this embodiment, light-blocking faces (the first and the second light-blocking faces) corresponding to the first scan light and the second scan light have the same shape, but the first and the second light-blocking faces may have different shapes.

As shown in FIGS. 15A and 15B, in a BD synchronization signal generating portion for receiving the first scan light and the second scan light, an output signal BD of a BD sensor 26 (see FIG. 16B) becomes as (BD1) when receiving the first scan light driven with a synchronizing signal SD1 (described later) and becomes as (BD2) when receiving the second scan light driven with a synchronizing signal SD2 (described later).

Figure 16A:
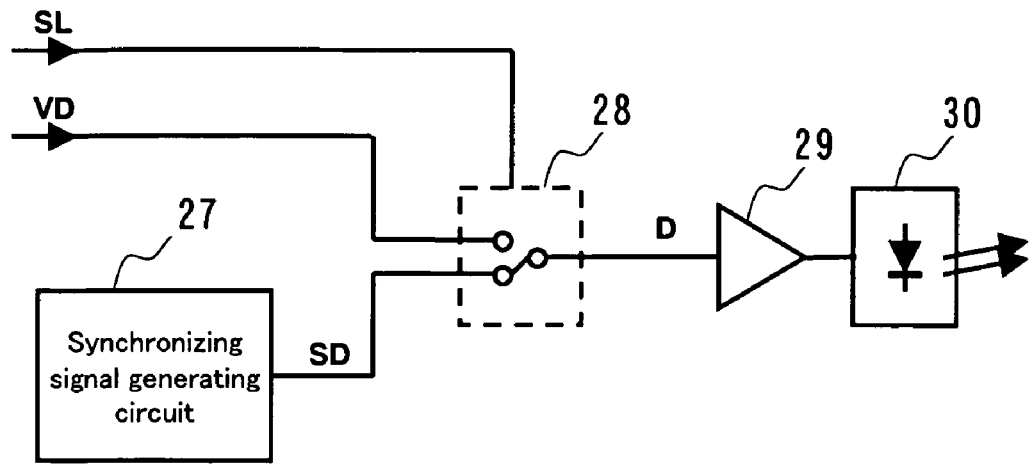
FIG. 16A is a block diagram of a circuit for driving a light source of the optical scanning unit in the third embodiment of the present invention.
Figure 16B:
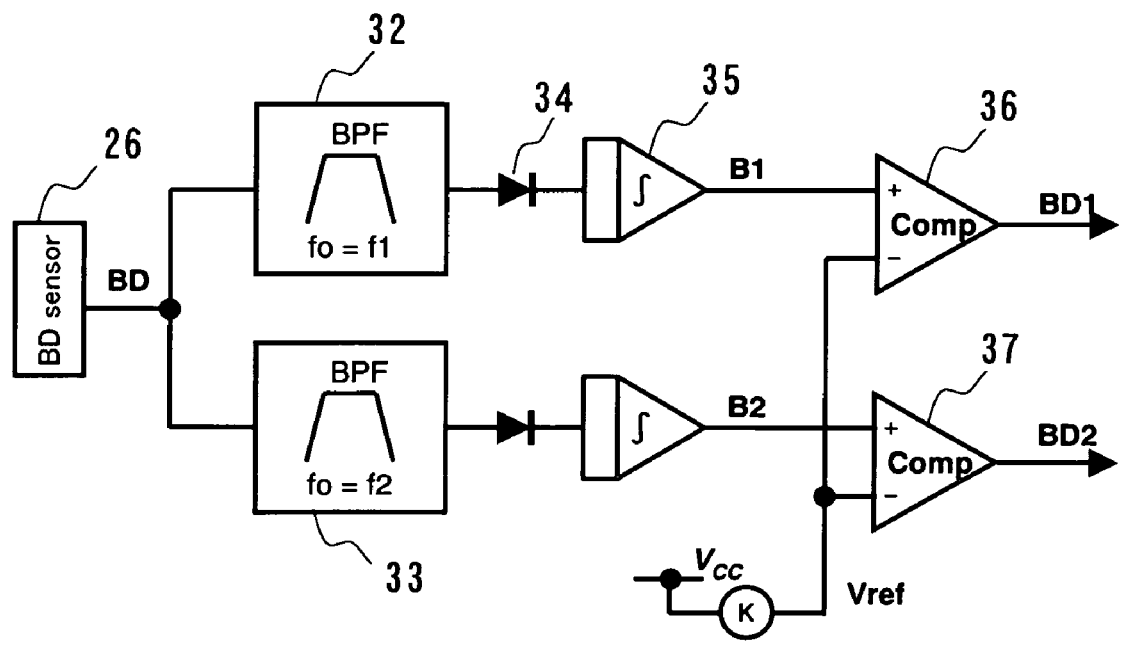
FIG. 16B is a block diagram of a circuit for receiving scan light of the optical scanning unit in the third embodiment of the present invention.

FIG. 16 shows a block diagram of a BD synchronization signal generating circuit in the optical scanning unit of this embodiment. FIG. 16A is a block diagram of a circuit for driving a light source of the optical scanning unit in this embodiment, and FIG. 16B is a block diagram of a circuit for receiving scan light of the optical scanning unit in this embodiment. The circuit for driving a light source of the optical scanning unit shown in FIG. 16A is provided for each of the first and the second scan lights.

First, in FIG. 16A, an image signal VD, which is a signal of an image that is to be formed using the optical scanning unit, and a switch signal SL (described later) are given by a control portion (not shown) for controlling the operation of the optical scanning unit.

A synchronizing signal generating circuit 27 generates a synchronizing signal SD, which is a signal necessary for generating a synchronization timing signal for image formation in the BD synchronization signal generating portion. Herein, the synchronizing signal SD is a signal (hereinafter, referred to as "SD1") repeating on/off with a frequency f1 (cycle is 1/f1) with respect to the first scan light, and is a signal (hereinafter, referred to as "SD2") repeating on/off with a frequency f2 (cycle is 1/f2) with respect to the second scan light. f1 and f2 have the relationship in which one is not an integral multiple of the other.

A switch circuit 28 selects, in accordance with the state of the switch signal SL, either the synchronizing signal SD from the synchronizing signal generating circuit 27 or the image signal VD from the control portion, and outputs the selected signal as an input signal D for a driving circuit 29 (described later).

The driving circuit 29 drives, with a current, a laser light emitting element 30 serving as the light source of the optical scanning unit, in accordance with the signal that is input. In other words, the laser light emitting element 30 emits light when the current flows.

Then, in FIG. 16B, the BD sensor 26 receives the first and the second scan lights that have passed through the slits 23 on the first and the second light-blocking faces 24 in FIG. 15A. Herein, the first and the second scan lights are laser beams from the laser light emitting element 30 scanned by a scanning means (not shown).

With respect to the signal BD that is input, a bandpass filter 32 shuts the signal component outside the frequency band with a center frequency f1 and a predetermined width such that the signal component only in the frequency band passes through and is output. A bandpass filter 33 shuts the signal component outside the frequency band with a center frequency f2 and a predetermined width such that the signal component only in the frequency band passes through and is output. Herein, the width of each band can shut the center frequency of the other band, and thus their center frequencies can be distinguished from each other.

A rectifier 34 and an integrator 35 are circuits for obtaining the size of the signal component that has passed through the bandpass filter 32. The integrator 35 releases the integrated charge (voltage) at a predetermined time constant.

A comparator 36 compares an output voltage B1 of the integrator 35 and a predetermined voltage, and outputs a digital signal BD1 indicating whether or not the size of the signal component that has passed through the bandpass filter 32 is larger than a predetermined size.

As for the signal component that has passed through the bandpass filter 33, a digital signal BD2 indicating whether or not the size is larger than a predetermined size is output from a comparator 37 in a similar manner.

Next, the operation of generating the BD synchronization signals in the thus configured BD synchronization signal generating circuit is described.

Figure 17:
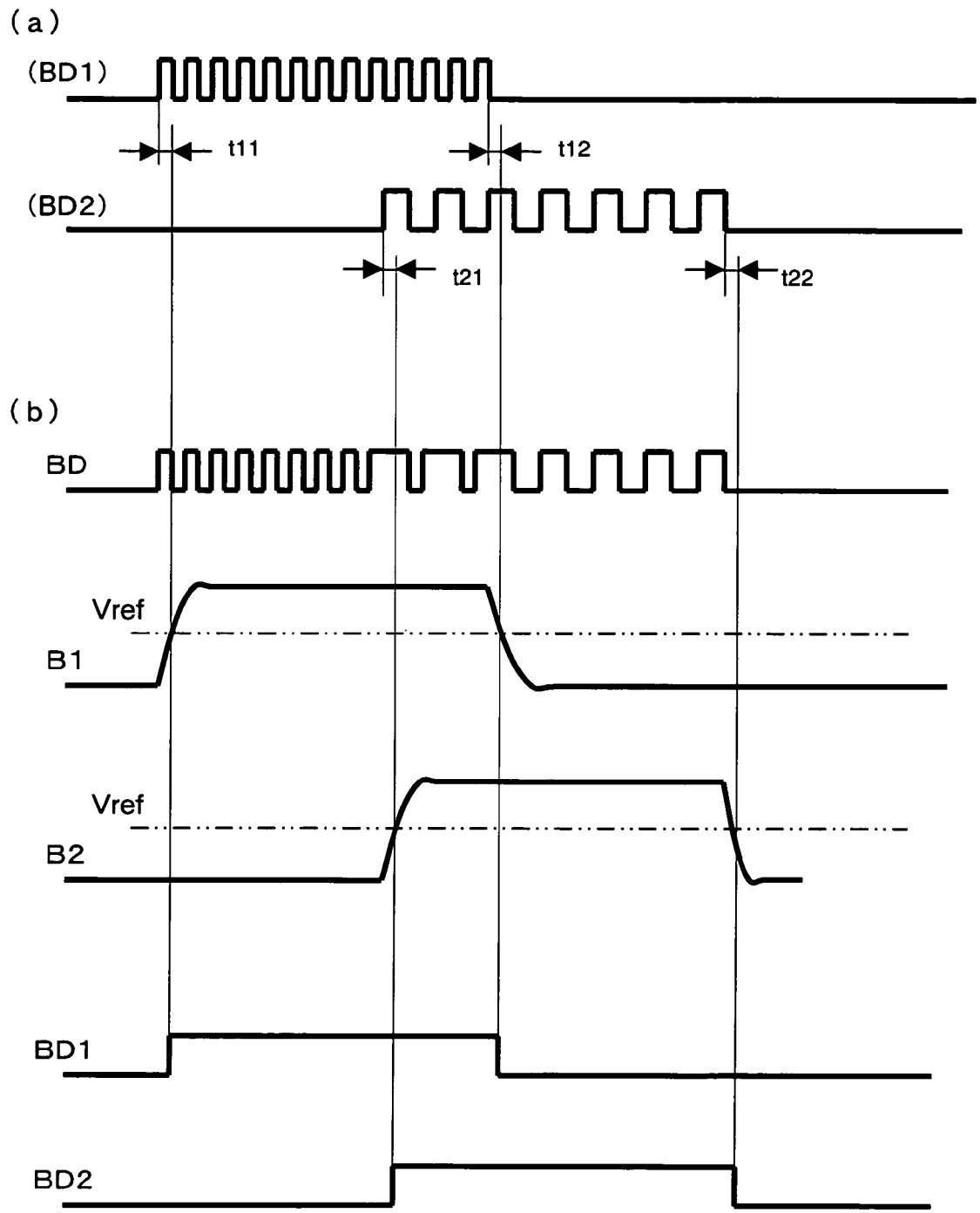
FIG. 17 is a timing chart of signals in generating BD synchronization signals in the third embodiment of the present invention.

FIGS. 17(*a*) and 17(*b*) show a timing chart of signals in generating the BD synchronization signals. FIG. 17(*a*) explains the time-based relationship between a state of (BD1) and a state of (BD2) in the output signal BD of the BD sensor 26.

In image formation, first, the control portion lets the scanning means start the scanning of a laser beam prior to the image formation. At that time, the switch signal SL lets the switch circuit 28 select the synchronizing signal SD, and thus the laser light emitting element 30 turns the light on/off in accordance with the synchronizing signal SD. The frequency of on/off is f1 based on the synchronizing signal SD1 in the first scan light, and is f2 based on the synchronizing signal SD2 in the second scan light.

On the other hand, in the BD synchronization signal generating portion for receiving these scan lights, the output signal BD of the BD sensor 26 becomes as (BD1) as shown in FIG. 15B when receiving the first scan light driven with the synchronizing signal SD1 and becomes as (BD2) as shown in FIG. 15B when receiving the second scan light driven with the synchronizing signal SD2, as described above.

Herein, the first scan light and the second scan light are scanned simultaneously and asynchronously, and thus (BD1) and (BD2) may be temporarily overlapped each other as shown in FIG. 17(*a*). At that time, the output signal BD of the BD sensor 26 that has received the scan lights becomes as shown in FIG. 17(*b*). Hereinafter, the operation of generating the BD synchronization signals is described using this case as an example.

The output signal BD of the BD sensor 26 passes through the bandpass filter 32, the rectifier 34, and the integrator 35, and thus as for only the component included in a predetermined band with the center frequency f1 among the frequency components included in the output signal BD, the voltage shown in FIG. 17(*b*) corresponding to the electric power amount is obtained as the output signal B1 of the integrator 35. Further, the output signal BD of the BD sensor 26 passes through the bandpass filter 33, the rectifier, and the integrator, and thus as for only the component included in a predetermined band with the center frequency f2 among the frequency components included in the output signal BD, the voltage shown in FIG. 17(*b*) corresponding to the electric power amount is obtained as the output signal B2 of the integrator.

Each of the output signals B1 and B2 of the integrators is compared with a predetermined voltage Vref at the comparator 36 or 37 to be the digital signal BD1 or BD2 as shown in FIG. 17(*b*).

The digital signals BD1 and BD2 shown in FIG. 17(*b*) have certain time-lags (t11, t12, t21, and t22) with respect to a corresponding signal among the signal (BD1) based on the first scan light and the signal (BD2) based on the second scan light, in the output signals BD from the BD sensor 26, and these time-delays hardly change. Accordingly, the digital signals BD1 and BD2 shown in FIG. 17(b) indicate scanning timings of the first scan light and the second scan light, and can be used as synchronization signals for image formation.

The generated synchronization signals BD1 and BD2 for the scan lights are given to the control portion, and the control portion performs information processing for the timings (time and period, for example) of the synchronization signals BD1 and BD2. After the periods of the synchronization signals BD1 and BD2 are stabilized, the control portion estimates the periodical generation time of synchronization signals, and switches the switch circuit 28 such that light is emitted based on the synchronizing signal SD only at and around the estimated generation time and light is emitted based on the image signal VD during the other time, in every period, with respect to the circuits (FIG. 16A) for driving the light sources of the scan lights. Thus, it is possible to generate the synchronization signals BD1 and BD2 and to drive the light sources based on the signal VD of an image subjected to image formation.

As described above, according to this embodiment, even in the configuration in which two scan lights that are independent of each other and that are asynchronously scanned are incident on the same BD sensor 26, it is possible to distinguish the scan lights from each other to precisely generate a synchronization signal for forming an image with respect to each scan light, by modulating the scan lights with mutually different synchronizing signals and by detecting the modulated signals.

Furthermore, this embodiment has been described using, as an example, the case in which two scan lights are used. However, also as for the case in which three or more scan lights are used, it is possible to distinguish the scan lights from each other to precisely generate a synchronization signal for forming an image with respect to each scan light, by modulating the scan lights with mutually different synchronizing signals and by detecting the modulated signals, in a similar manner to that in this embodiment.

Fourth Embodiment

Next, in the optical scanning device of the present invention, another embodiment in which it is determined from which optical system a detected synchronization signal has been emitted is described with reference to FIGS. 18 and 19. Herein, the overall configuration of the optical scanning device in this embodiment is substantially the same as that in the first embodiment and thus the optical scanning device in this embodiment is described with reference to also FIGS. 1 to 3.

Figure 18:
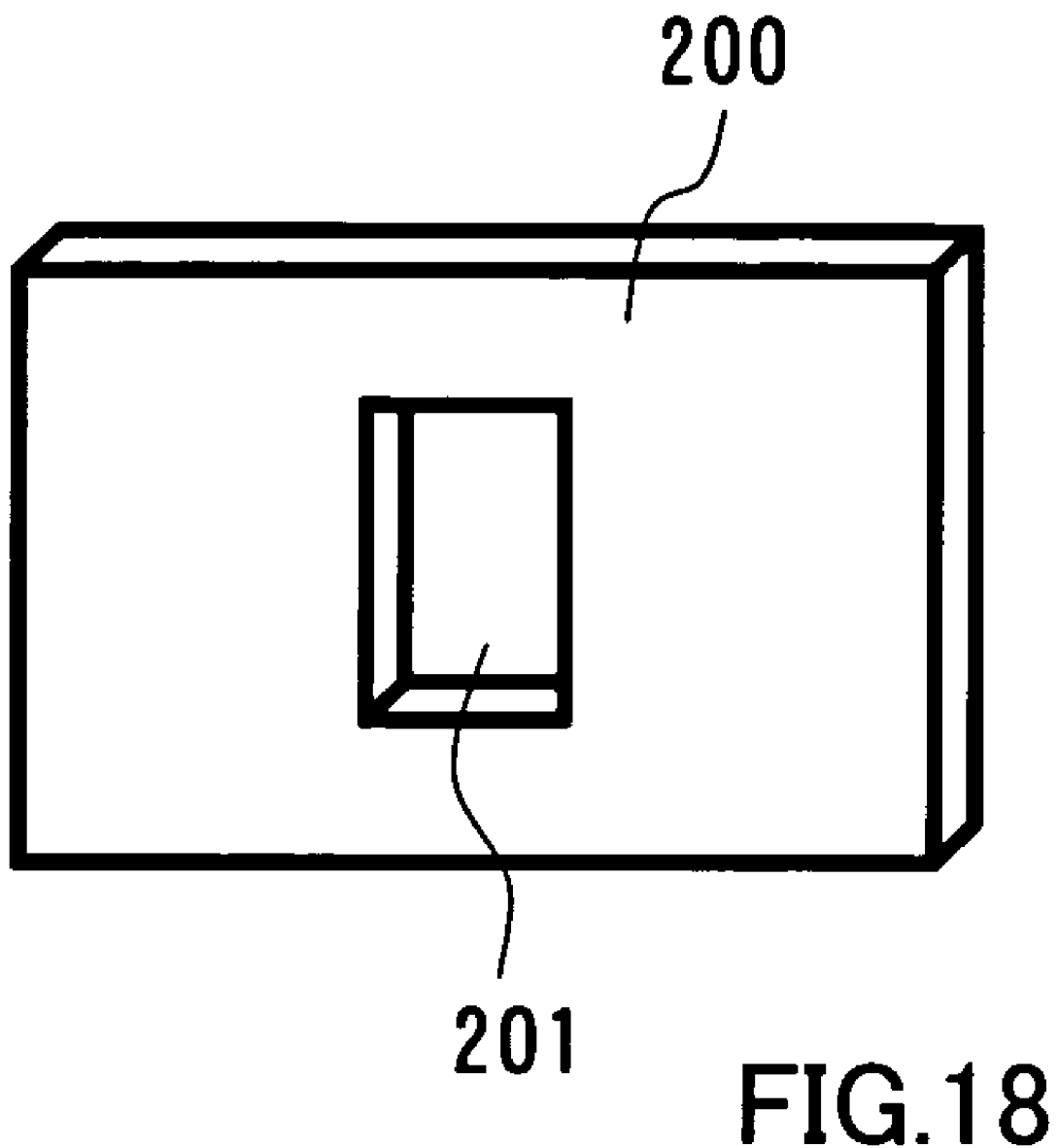
FIG. 18 is a perspective view showing a slit plate used in an optical scanning device in a fourth embodiment of the present invention.

FIG. 18 shows a slit plate used in the optical scanning device of this embodiment. As shown in FIG. 18, a slit plate 200 has one slit 201.

In this embodiment, a motor outputting an origin signal indicating the rotation origin is used as a polygon motor for rotatively driving a polygon mirror. The polygon mirrors 113 and 213 (see FIGS. 1 to 3) are arranged at mutually different angels such that their phases are different with respect to the origin positions of the polygon motors on which the polygon mirrors are installed. In this embodiment, the angle difference is an angle corresponding to the difference between t1 and t2 in FIG. 19 (described later).

Figure 19:
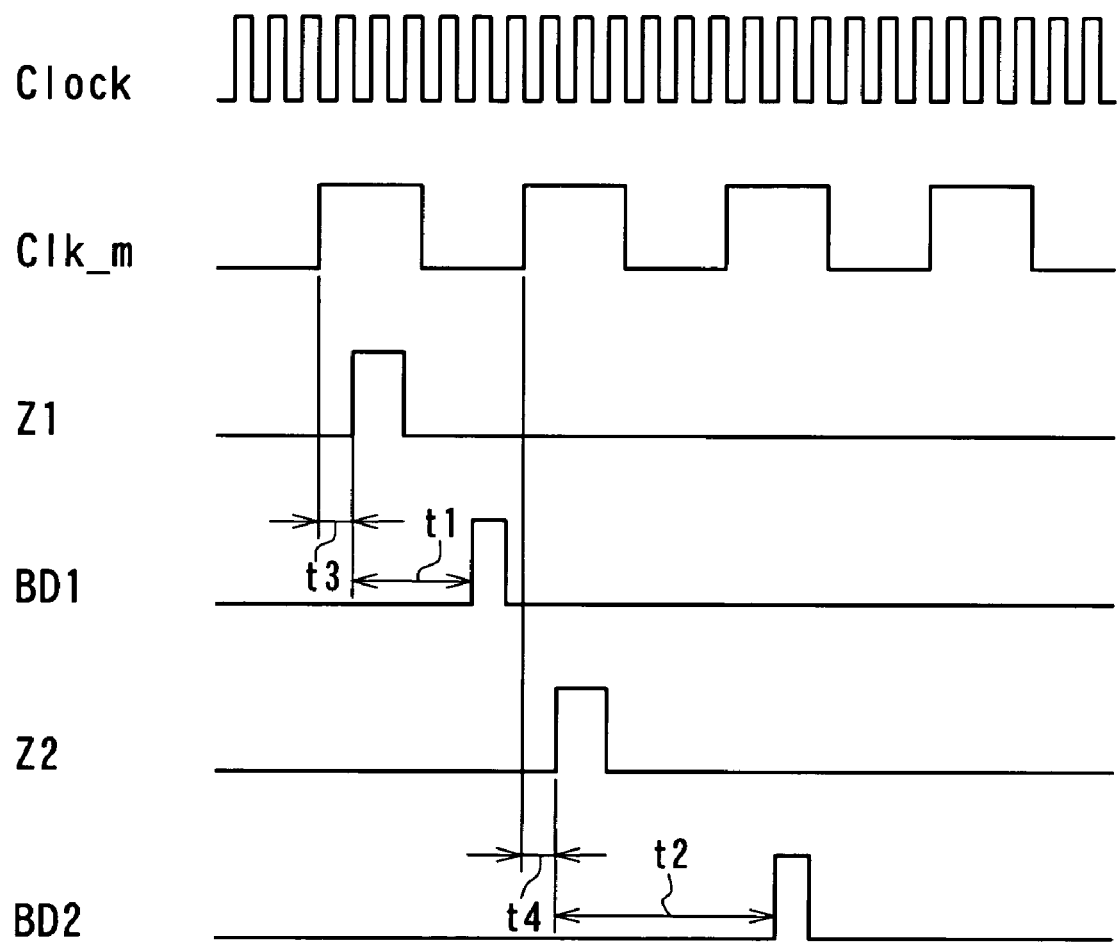
FIG. 19 is a timing chart of signals from polygon motors and a BD sensor in the optical scanning device in the fourth embodiment of the present invention.

FIG. 19 shows a timing chart of signals from the polygon motors and the BD sensor 120 (see FIGS. 1 to 3) in the optical scanning device of this embodiment.

In FIG. 19, "Clock" denotes an operation clock for digital circuit processing, "Clk_m" denotes a rotation control operation clock for the polygon motors, "Z1" denotes an origin signal for the polygon motor on which the polygon mirror 113 is installed, "BD1" denotes a synchronization signal that is output from the BD sensor 120 when a laser beam deflected by the polygon mirror 113 passes through the slit 201 on the slit plate 200, "Z2" denotes an origin signal for the polygon motor on which the polygon mirror 213 is installed, and "BD2" denotes a synchronization signal that is output from the BD sensor 120 when a laser beam deflected by the polygon mirror 213 passes through the slit 201 on the slit plate 200.

When the origin signals Z1 and Z2 are detected, a means such as, but not limited to, a counter (not shown) measures a time until a next synchronization signal from the BD sensor 120 is detected. The detected synchronization signal is determined to be the synchronization signal BD1 in the optical system 11 (see FIG. 2) if the measured time is t1, and the detected synchronization signal is determined to be the synchronization signal BD2 in the optical system 21 (see FIG. 2) if the measured time is t2.

A generic polygon motor rotates always with the same phase with respect to the rotation control operation clock Clk_m, and thus the phase of the rotation control operation clock Clk_m is the same as those of the origin signals Z1 and Z2 when their phases with respect to the origin positions are the same (t3=t4 in FIG. 19). Accordingly, when the polygon mirrors 113 and 213 are arranged such that t2−t1 (when t2>t1) is not an integral multiple of the period of the rotation control operation clock Clk_m, the synchronization signal BD1 and the synchronization signal BD2 are not simultaneously detected, and thus it is always possible to determine from which optical system (the optical system 11 or the optical system 21) the detected synchronization signal has been emitted.

Fifth Embodiment

Figure 20:
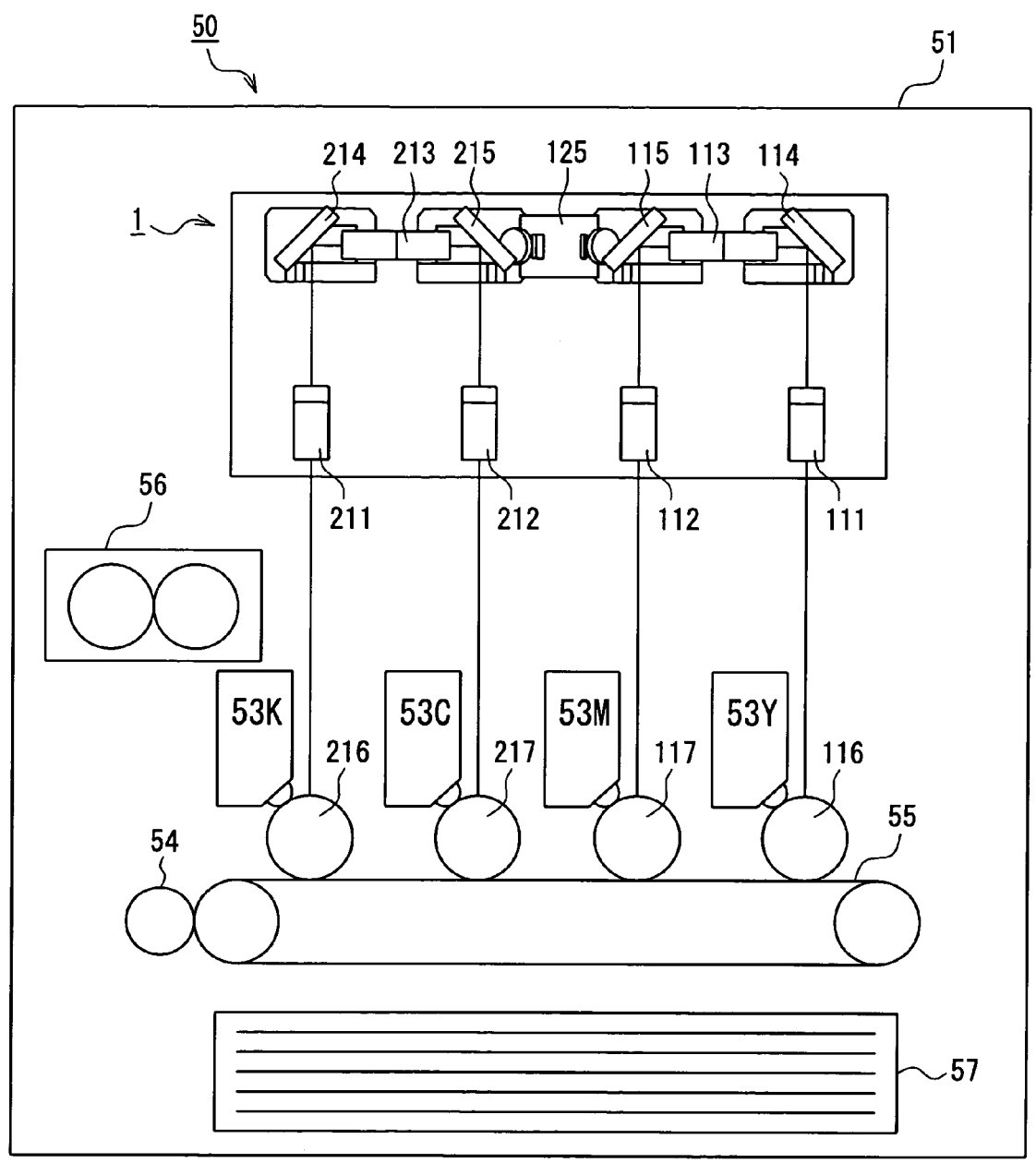
FIG. 20 is a front view showing the inner configuration of an image forming apparatus in a fifth embodiment of the present invention.

Next, an image forming apparatus provided with the optical scanning device is described with reference to FIG. 20. FIG. 20 is a front view showing the inner configuration of the image forming apparatus of this embodiment.

As shown in FIG. 20, an inner portion of a casing 51 of an image forming apparatus 50 is provided with the optical scanning device 1 (see FIG. 3) of the first embodiment. The inner portion of the casing 51 is provided with the rotatable photosensitive drums 116, 117, 216, and 217 that have cylindrical shapes extending in the scan direction of laser beams in the optical scanning device 1 and developing devices 53Y, 53M, 53C, and 53K in which yellow, magenta, cyan, and black toner are respectively stored in their inner portions and in which toner with different colors is supplied to the outer circumferential surfaces (surfaces to be scanned) of the corresponding photosensitive drums 116, 117, 216, and 217 and is attached thereon. Further, the inner portion of a casing 51 of an image forming apparatus 50 also is provided with an intermediate transfer belt 55 onto which color toner images formed on the outer circumferential surfaces of the photosensitive drums 116, 117, 216, and 217 are overlapped one on another to be transferred, a transfer charger 54 serving as a transferring device for retransferring toner images that have been transferred onto the intermediate transfer belt 55 to recording paper serving as a recording material, a fixing device 56 in which the toner images that have been retransferred to the recording paper are fixed, and a paper feed cassette 57.

According to the image forming apparatus 50 in this embodiment, the optical scanning device 1 of the first embodiment is provided, and thus it is possible to realize an image forming apparatus that can achieve a suppression of vibrations while reducing the cost. The image forming apparatus provided with the optical scanning device 1 can be used as various types of image forming apparatuses such as for example laser beam printers, laser facsimiles, and digital copiers.

Furthermore, as a method for determining from which optical system a detected synchronization signal has been emitted, the method described in the fourth embodiment may be used.

Furthermore, the optical scanning device 1 of the first embodiment is used as an optical scanning device in this embodiment, but it is possible to distinguish a plurality of scan lights from each other to precisely generate a synchronization signal for forming an image with respect to each scan light, by additionally using the configuration in the second or the third embodiment, and thus it is possible to improve the image quality.

As described above, according to the optical scanning device of the present invention, it is possible to achieve both a simplification of the device and a reduction of vibrations. Accordingly, the optical scanning device of the present invention is useful for, for example, in laser beam printers, laser facsimiles, and digital copiers in which a reduction of the cost and a suppression of vibrations are desired.

It is noted that the foregoing examples have been provided merely for the purpose of explanation and are in no way to be construed as limiting of the present invention. While the present invention has been described with reference to exemplary embodiments, it is understood that the words that have been used herein are words of description and illustration, rather than words of limitation. The present teachings can readily be realized, and applied to other types of apparatuses. Changes may be made, within the purview of the appended claims, as presently stated and as amended, without departing from the scope and sprit of the present invention in its various versions. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims. Alternative structures discussed for the purpose of highlighting the invention's advantages do not constitute prior art unless expressly so identified. No one or more features of the present invention are necessary or critical unless otherwise specified.

What is claimed is:

1. An optical scanning device comprising a first optical system and a second optical system that are provided in one housing frame, each of the first optical system and the second optical system comprising:
    two light sources,
    one optical deflector for scanning light beams from the two light sources with mutually different deflection faces of the optical deflector,
    two first imaging optical systems that are arranged between the optical deflector and the two respective light sources, that guide the light beams from the two light sources to the deflection faces of the optical deflector, and that form linear images on the deflection faces, and
    two second imaging optical systems that are arranged between the optical deflector and two respective surfaces to be scanned, that guide the light beams from the optical deflector to the two surfaces to be scanned, and that form images on the two surfaces to be scanned,
    wherein the optical scanning device simultaneously exposes, by scanning, the four surfaces to be scanned, and
    wherein the optical deflector provided in the first optical system and the optical deflector provided in the second optical system rotate in mutually opposite directions.

2. The optical scanning device according to claim 1, comprising:
    one optical detector for detecting light beams that are scanned with the optical deflectors of the first optical system and of the second optical system.

3. The optical scanning device according to claim 2, comprising:
    a first and a second slit arranged between the optical detector and the respective optical deflectors in the first and the second optical systems,
    wherein a width of the first slit is different from a width of the second slit.

4. The optical scanning device according to claim 2, comprising:
    a first and a second set of slits arranged between the optical detector and the respective optical deflectors in the first and the second optical systems,
    wherein a number of openings of the first set of slits is different from a number of openings of the second set of slits.

5. The optical scanning device according to claim 2, wherein the first and the second optical systems are arranged so as to be mirror symmetrical with respect to a plane extending through the optical detector.

6. The optical scanning device according to claim 2, wherein the optical detector receives light beams that are scanned, through a plurality of light-blocking faces having slits with mutually different combinations of width, number, and interval.

7. The optical scanning device according to claim 2, wherein the light beams that are scanned are modulated with signals having mutually different frequencies at least when the optical detector detects the light beams.

8. An image forming apparatus, comprising:
    the optical scanning device according to claim 1, a plurality of rotatable photosensitive members that correspond to a plurality of different colors, outer circumferential surfaces of the rotatable photosensitive members comprising the surfaces to be scanned, and that have substantially cylindrical shapes extending in a scan direction of light beams of the optical scanning device,
    a plurality of developing devices, from which toner with different colors is supplied to the outer circumferential surfaces of the plurality of photosensitive members, the toners being attached to the outer circumferential surfaces,
    an intermediate transfer belt onto which color toner images formed on the outer circumferential surfaces of the plurality of photosensitive members are overlapped with one another to be transferred, and
    a transfer unit that retransfers the toner images that have been transferred onto the intermediate transfer belt, to a recording material.

* * * * *